(12) United States Patent
Smitherman

(10) Patent No.: US 7,725,258 B2
(45) Date of Patent: *May 25, 2010

(54) VEHICLE BASED DATA COLLECTION AND PROCESSING SYSTEM AND IMAGING SENSOR SYSTEM AND METHODS THEREOF

(75) Inventor: Chester L. Smitherman, Houson, TX (US)

(73) Assignee: M7 Visual Intelligence, L.P., Houston, TX (US)

( * ) Notice: Subject to any disclaimer, the term of this patent is extended or adjusted under 35 U.S.C. 154(b) by 828 days.

This patent is subject to a terminal disclaimer.

(21) Appl. No.: 11/581,235

(22) Filed: Oct. 11, 2006

(65) Prior Publication Data

US 2007/0046448 A1 Mar. 1, 2007

Related U.S. Application Data

(63) Continuation-in-part of application No. 10/664,737, filed on Sep. 18, 2003, now Pat. No. 7,127,348.

(60) Provisional application No. 60/412,504, filed on Sep. 20, 2002.

(51) Int. Cl.
  G03B 37/00 (2006.01)
  G01C 11/02 (2006.01)
  G01C 21/00 (2006.01)
(52) U.S. Cl. .............. 701/213; 701/200; 348/144
(58) Field of Classification Search ............. None
  See application file for complete search history.

(56) References Cited

U.S. PATENT DOCUMENTS 1,699,136 A 1/1929 Eliel (Continued)

FOREIGN PATENT DOCUMENTS

DE 197 14 396 A1 10/1998

(Continued)

OTHER PUBLICATIONS

Mohamed M.R. Mostafa, Joe Hutton; Emerge DSS: A Fully Integrated Digital System for Airborne Mapping; Sep. 22-23, 2003; http://www.isprs.org/commissionl/theory_tech_realities/.

(Continued)

*Primary Examiner*—Michael J. Zanelli
(74) *Attorney, Agent, or Firm*—Jennifer Sickler; Teresa Lechner-Fish; Gardere Wynne Sewell LLP

(57) ABSTRACT

A vehicle based data collection and processing system which may be used to collect various types of data from an aircraft in flight or from other moving vehicles, such as an automobile, a satellite, a train, etc. In various embodiments the system may include: computer console units for controlling vehicle and system operations, global positioning systems communicatively connected to the one or more computer consoles, camera array assemblies for producing an image of a target viewed through an aperture communicatively connected to the one or more computer consoles, attitude measurement units communicatively connected to the one or more computer consoles and the one or more camera array assemblies, and a mosaicing module housed within the one or more computer consoles for gathering raw data from the global positioning system, the attitude measurement unit, and the retinal camera array assembly, and processing the raw data into orthorectified images.

23 Claims, 14 Drawing Sheets

U.S. PATENT DOCUMENTS

| | | |
|---|---|---|
| 2,104,976 A | 1/1938 | Eliel |
| 2,433,534 A | 12/1947 | Stone |
| 2,747,012 A | 5/1956 | Dresser |
| 2,955,518 A | 10/1960 | Perry |
| 3,518,929 A | 7/1970 | Glenn |
| 4,322,741 A | 3/1982 | Kawabayashi |
| 4,504,914 A | 3/1985 | Hofmann |
| 4,650,305 A | 3/1987 | Hines |
| 4,689,748 A | 8/1987 | Hofmann |
| 4,708,472 A | 11/1987 | Hofmann |
| 4,724,449 A | 2/1988 | Wright |
| 4,750,810 A | 6/1988 | Tomlin et al. |
| 4,757,378 A | 7/1988 | Hackett, Jr. et al. |
| 4,935,629 A | 6/1990 | Livermore et al. |
| 4,956,705 A | 9/1990 | Wright |
| 5,027,199 A | 6/1991 | Suzuki |
| 5,029,009 A | 7/1991 | Ulich et al. |
| 5,104,217 A | 4/1992 | Pleitner |
| 5,138,444 A | 8/1992 | Hiramatsu |
| 5,193,124 A | 3/1993 | Subbarao |
| 5,249,034 A | 9/1993 | Minato |
| 5,276,321 A | 1/1994 | Chang |
| 5,426,476 A | 6/1995 | Fussell et al. |
| 5,471,056 A | 11/1995 | Prelat |
| 5,517,419 A | 5/1996 | Lanckton et al. |
| 5,555,018 A | 9/1996 | von Braun |
| 5,604,534 A | 2/1997 | Hedge et al. |
| 5,721,611 A | 2/1998 | Kellner |
| 5,734,507 A | 3/1998 | Harvey |
| 5,815,314 A | 9/1998 | Sudo |
| 5,872,590 A | 2/1999 | Aritake et al. |
| 5,878,356 A | 3/1999 | Garrot et al. |
| 5,894,323 A | 4/1999 | Kain et al. |
| 6,125,329 A | 9/2000 | Place et al. |
| 6,281,970 B1 | 8/2001 | Williams et al. |
| 6,422,508 B1 | 7/2002 | Barnes |
| 6,456,938 B1 | 9/2002 | Barnard |
| 6,473,119 B1 | 10/2002 | Teuchert |
| 6,711,475 B2 | 3/2004 | Murphy |
| 6,747,686 B1 | 6/2004 | Bennett |
| 6,834,163 B2 | 12/2004 | Trunz |
| 6,954,310 B2 | 10/2005 | Holloway et al. |
| 7,006,709 B2 | 2/2006 | Kang et al. |
| 7,437,062 B2 * | 10/2008 | Holcomb ........................ 396/7 |
| 2002/0060784 A1 | 5/2002 | Pack et al. |

FOREIGN PATENT DOCUMENTS

| | | |
|---|---|---|
| EP | 1069547 A1 | 1/2001 |
| GB | 2284273 A | 5/1995 |
| WO | WO 02/06892 A | 1/2002 |

OTHER PUBLICATIONS

Richard D. Sanchez; Airborne Digital Sensor System and GPS-aided Inertial Technology for Direct Geopositioning in Rough Terrain; Open-File Report 2004-1391; USGS; Reston, VA.

* cited by examiner

VEHICLE BASED DATA COLLECTION AND PROCESSING SYSTEM AND IMAGING SENSOR SYSTEM AND METHODS THEREOF

CROSS-REFERENCE TO RELATED APPLICATION

This application is a continuation-in-part of prior U.S. patent application Ser. No. 10/664,737, filed Sep. 18, 2003, now U.S. Pat. No. 7,127,348 which claimed priority to U.S. Provisional Patent Application Ser. No. 60/412,504 filed Sep. 20, 2002 for "Vehicle Based Data Collection and Processing System."

TECHNICAL FIELD OF THE INVENTION

The present invention relates, generally, to the field of remote imaging techniques and, more particularly, to a system for rendering high-resolution, high accuracy, low distortion digital images over very large fields of view.

BACKGROUND OF THE INVENTION

Remote sensing and imaging are broad-based technologies having a number of diverse and extremely important practical applications—such as geological mapping and analysis, military surveillance and planning, and meteorological forecasting. Aerial and satellite-based photography and imaging are especially useful remote imaging techniques that have, over recent years, become heavily reliant on the collection and processing of digital image, spectral, spatial, elevation, and vehicle location and orientation data. Spatial data—characterizing real estate improvements and locations, roads and highways, environmental hazards and conditions, utilities infrastructures (e.g., phone lines, pipelines), and geophysical features—can now be collected, processed, and communicated in a digital format to conveniently provide highly accurate mapping and surveillance data for various applications (e.g., dynamic GPS mapping). Elevation data may be used to improve the overall system's spatial and positional accuracy and may be acquired from either existing Digital Elevation Model (DEM) data sets or collected with the spectral sensor data from an active, radiation measuring Doppler based devices, or passive, stereographic calculations.

Major challenges facing some such remote sensing and imaging applications are spatial resolution and spectral fidelity. Photographic issues, such as spherical aberrations, astigmatism, field curvature, coma, distortion, and chromatic aberrations are well known problems that must be dealt with in any sensor/imaging application. Certain applications require very high image resolution—often with tolerances of inches. Depending upon the particular system used (e.g., aircraft, satellite, or space vehicle), an actual digital imaging device may be located anywhere from several feet to miles from its target, resulting in a very large scale factor. Providing images with very large scale factors, that also have resolution tolerances of inches, poses a challenge to even the most robust imaging system. Thus, conventional systems usually must make some trade-off between resolution quality and the size of a target area that can be imaged. If the system is designed to provide high-resolution digital images, then the field of view (FOV) of the imaging device is typically small. If the system provides a larger FOV, then usually the resolution of the spectral and spatial data is decreased and distortions are increased.

Ortho-imaging is an approach that has been used in an attempt to address this problem. In general, ortho-imaging renders a composite image of a target by compiling varying sub-images of the target. Typically, in aerial imaging applications, a digital imaging device that has a finite range and resolution records images of fixed subsections of a target area sequentially. Those images are then aligned according to some sequence to render a composite of a target area.

Often, such rendering processes are very time-consuming and labor intensive. In many cases, those processes require iterative processing that measurably degrades image quality and resolution—especially in cases where thousands of sub-images are being rendered. In cases where the imaging data can be processed automatically, that data is often repetitively transformed and sampled—reducing color fidelity and image sharpness with each successive manipulation. If automated correction or balancing systems are employed, such systems may be susceptible to image anomalies (e.g., unusually bright or dark objects)—leading to over or under-corrections and unreliable interpretations of image data. In cases where manual rendering of images is required or desired, time and labor costs are immense.

There is, therefore, a need for an ortho-image rendering system that provides efficient and versatile imaging for very large FOVs and associated data sets, while maintaining image quality, accuracy, positional accuracy and clarity. Additionally, automation algorithms are applied extensively in every phase of the planning, collecting, navigating, and processing all related operations.

SUMMARY OF THE INVENTION

The present invention relates to a vehicle data collection and processing system using remote sensors. The system may include computer console units that control vehicle and system operations in real-time. The system may also include global positioning systems that are linked to and communicate with the computer consoles. Additionally, cameras and/or camera array assemblies can be employed for producing an image of a target viewed through an aperture. The camera array assemblies are communicatively connected to the computer consoles. The camera array assembly has a mount housing, a first imaging sensor centrally coupled to the housing having a first focal axis passing through the aperture. The camera array assembly also has a second imaging sensor coupled to the housing and offset from the first imaging sensor along an axis, that has a second focal axis passing through the aperture and intersecting the first focal axis within an intersection area. The camera array assembly has a third imaging sensor, coupled to the housing and offset from the first imaging sensor along the axis, opposite the second imaging sensor, that has a third focal axis passing through the aperture and intersecting the first focal axis within the intersection area. Any number of one-to-n cameras may be used in this manner, where n can be any odd or even number.

The system may also include an Attitude Measurement Unit (AMU) such as inertial, optical, or similar measurement units communicatively connected to the computer consoles and the camera array assemblies. The AMU may determine the yaw, pitch, and/or roll of the aircraft at any instant in time and successive DGPS positions may be used to measure the vehicle heading with relation to geodesic north. The AMU data is integrated with the precision DGPS data to produce a robust, real-time AMU system. The system may further include a mosaicing module housed within the computer consoles. The mosaicing module includes a first component for performing initial processing on an input image. The mosaicing module also includes a second component for determining geographical boundaries of an input image with the second component being cooperatively engaged with the first component. The mosaicing module further includes a third component for mapping an input image into the composite image with accurate geographical position. The third component being cooperatively engaged with the first and second components. A fourth component is also included in the mosaicing module for balancing color of the input images mapped into the composite image. The fourth component can be cooperatively engaged with the first, second and third components. Additionally, the mosaicing module can include a fifth component for blending borders between adjacent input images mapped into the composite image. The fifth component being cooperatively engaged with the first, second, third and fourth components.

A sixth component, an optional forward oblique and/or optional rear oblique camera array system may be implemented that collects oblique image data and merges the image data with attitude and positional measurements in order to create a digital elevation model using stereographic techniques. Creation of which may be performed in real-time onboard the vehicle or post processed later. This sixth component works cooperatively with the other components. All components may be mounted to a rigid platform for the purpose of providing co-registration of sensor data. Vibrations, turbulence, and other forces may act on the vehicle in such a way as to create errors in the alignment relationship between sensors. Utilization of common, rigid platform mount for the sensors provides a significant advantage over other systems that do not use this co-registration architecture.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not limit the scope of the invention.

Figure 1:
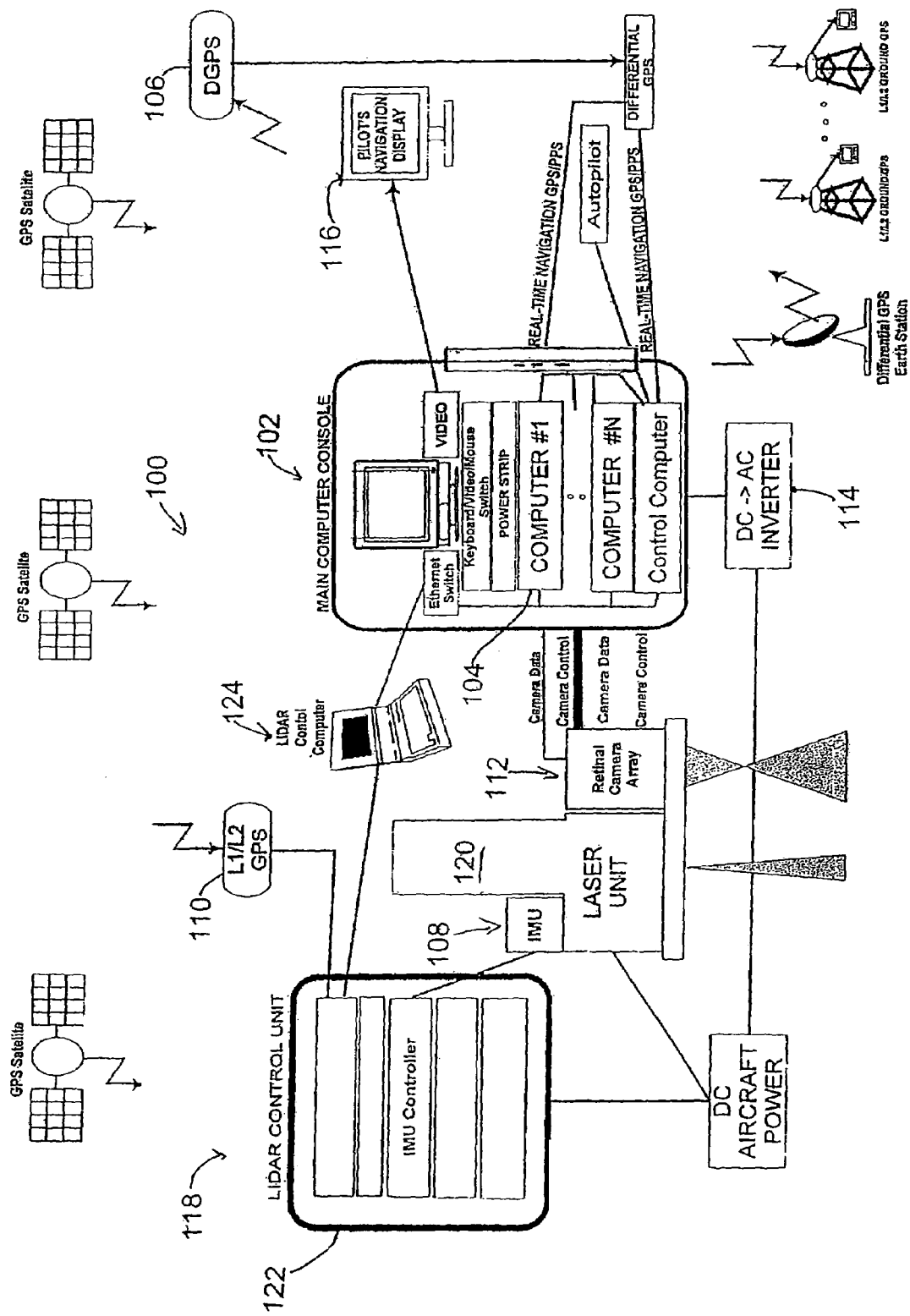
FIG. 1 illustrates a vehicle based data collection and processing system of the present invention.
Figure 1A:
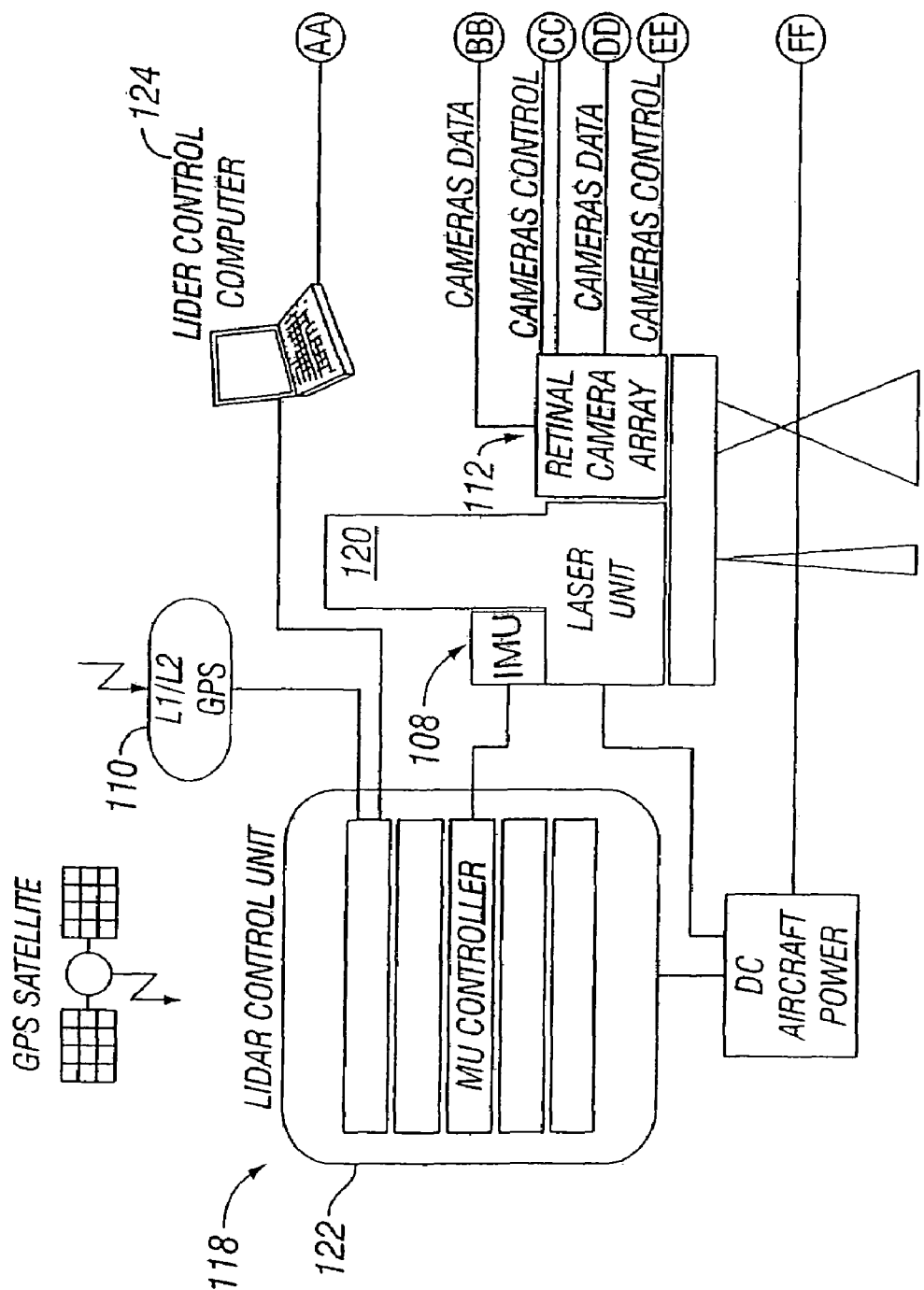
FIG. 1A illustrates a portion of the vehicle based data collection and processing system of FIG. 1.
Figure 1B:
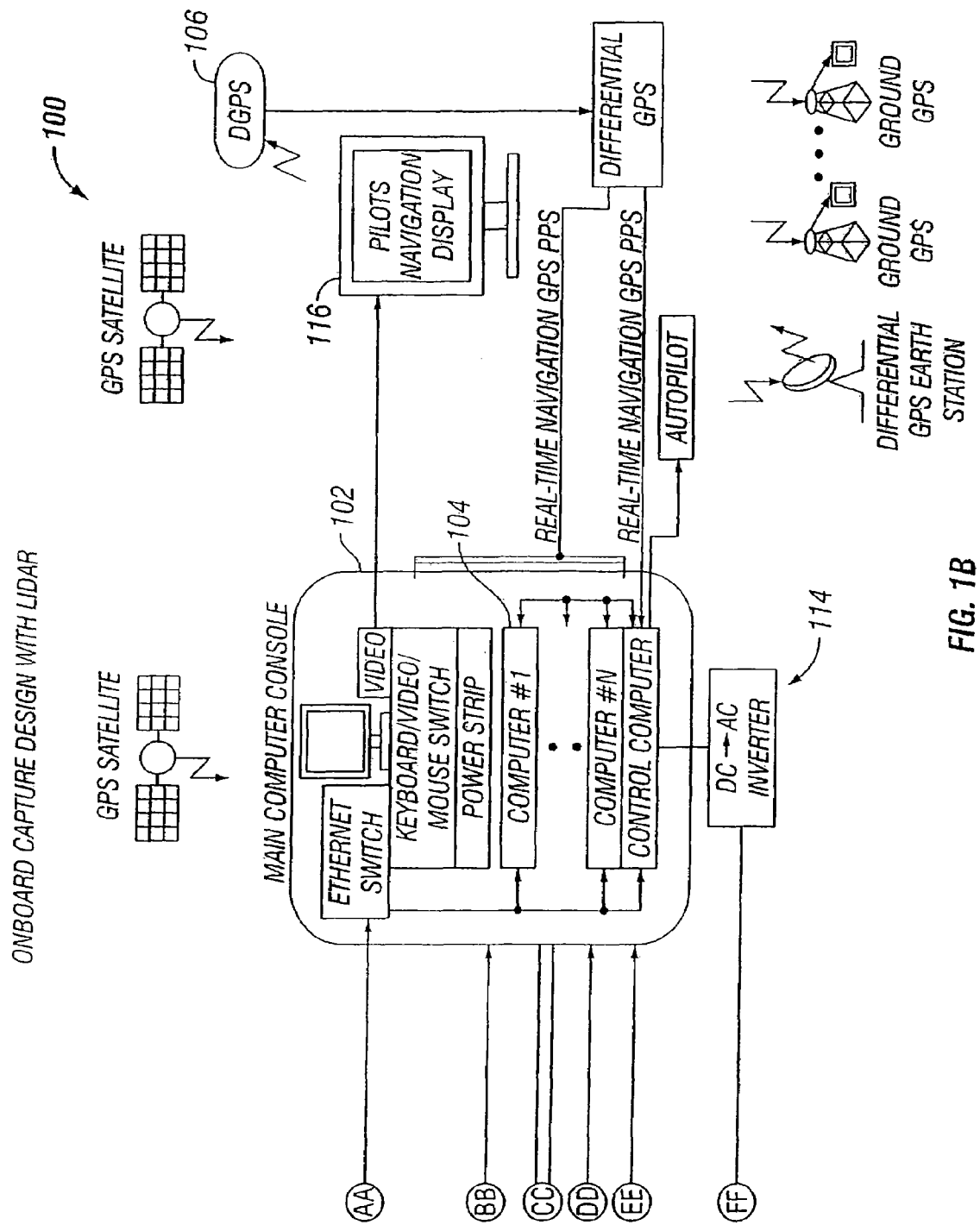
FIG. 1B illustrates a portion of the vehicle based data collection and processing system of FIG. 1.
Figure 2:
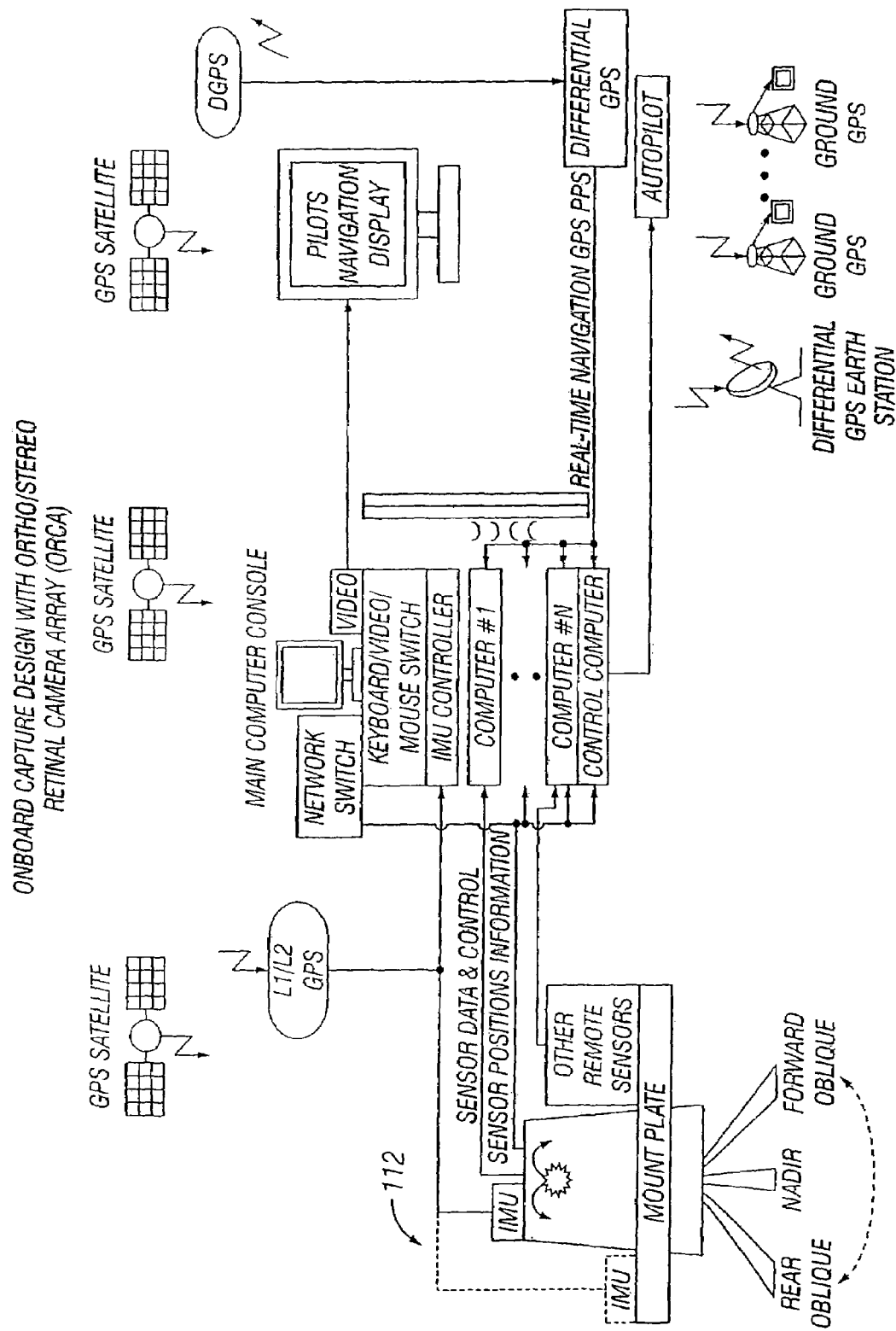
FIG. 2 illustrates a vehicle based data collection and processing system of FIG. 1 with the camera array assembly of the present invention shown in more detail.
Figure 18:
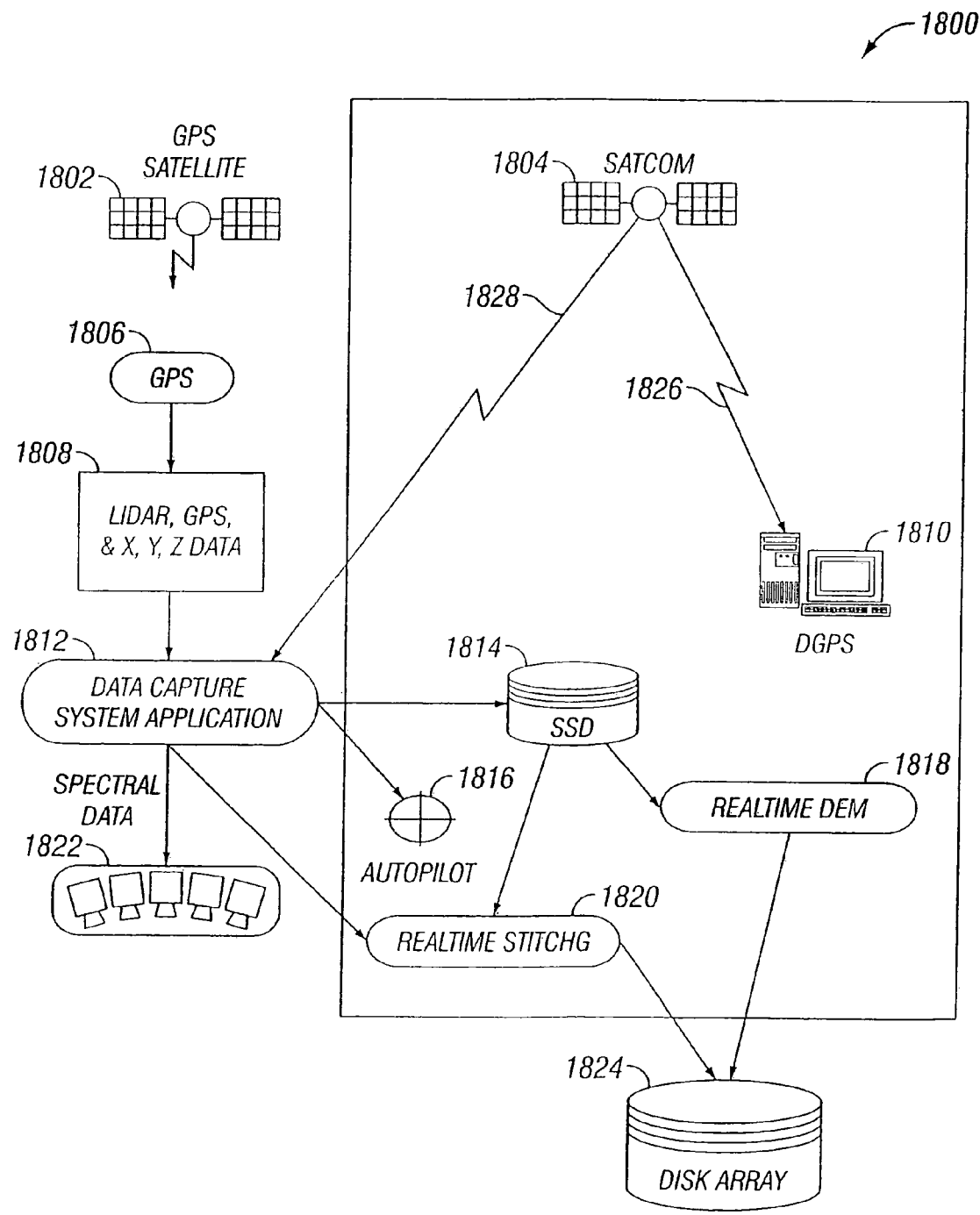
FIG. 18 is a schematic of the system architecture according to certain embodiments of the present invention.

A vehicle based data collection and processing system 100 of the present invention is shown in FIGS. 1, 1A, and 1B. Additional aspects and embodiments of the present invention are shown in FIGS. 2 and 18. System 100 includes one or more computer consoles 102. The computer consoles 102 contain one or more computers 104 for controlling both vehicle and system operations. Examples of the functions of the computer console 102 are the controlling digital color sensor systems 112 that can be associated with the data collection and processing system 100, providing the display data to a pilot, coordinating the satellite generated GPS pulse-per-second (PPS) event trigger (which may be 20 or more pulses per second), data logging, sensor control and adjustment, checking and alarming for error events, recording and indexing photos, storing and processing data, flight planning capability that automates the navigation of the vehicle, data, and providing a real-time display of pertinent information. A communications interface between the control computer console 102 and the vehicle autopilot control provides the ability to actually control the flight path of the vehicle 100 in real-time. This results in a more precise control of the vehicle's path than is possible by a human being. All of these functions can be accomplished by the use of various computer programs that are synchronized to the GPS PPS signals and take into account the various electrical latencies of the measurement devices. In an embodiment, the computer 104 is embedded within the sensors 306 through 314.

One or more differential global positioning systems 106 are incorporated into the system 100. The global positioning systems 106 are used to navigate and determine precise flight paths during vehicle and system operations. To accomplish this, the global positioning systems 106 are communicatively linked to the computer console 102 such that the information from the global positioning systems 106 can be acquired and processed without flight interruption. Zero or more GPS units may be located at known survey points in order to provide a record of each sub-seconds' GPS satellite-based errors in order to be able to back correct the accuracy of the system 100. GPS and/or ground based positioning services may be used that eliminate the need for ground control points altogether. This technique results in greatly improved, sub-second by sub-second positional accuracy of the data capture vehicle 100.

One or more AMUs 108 that provide real-time yaw, pitch, and roll information that is used to accurately determine the attitude of the vehicle 100 at the instant of data capture are also communicatively linked to the computer console 102. The present attitude measurement unit 108 (AMU) (e.g. Applanix POS AV), uses three high performance fiber optic gyros, one gyro each for yaw, pitch, and roll measurement. AMUs from other manufacturers, and AMUs that use other inertial measurement devices can be used as well. Additionally, an AMU 108 may be employed to determine the instantaneous attitude of the vehicle 100 and make the system more fault tolerant to statistical errors in AMU readings.

One or more camera array assemblies 112 for producing an image of a target viewed through an aperture are also communicatively connected to the one or more computer consoles 102. The camera array assemblies 112, which will be described in greater detail below, provide the data collection and processing system with the ability to capture high resolution, high precision progressive scan or line scan, color digital photography.

The system may also include DC power and conditioning equipment 114 to condition DC power and to invert DC power to AC power in order to provide electrical power for the system. The system may further include a navigational display 116, which graphically renders the position of the vehicle versus the flight plan for use by the pilot (either onboard or remote) of the vehicle to enable precision flight paths in horizontal and vertical planes. The system may also include an EMU module comprised of LIDAR, SAR 118 or a forward and rear oblique camera array for capturing three dimensional elevation/relief data. The EMU module 118 can include a laser unit 120, an EMU control unit 122, and an EMU control computer 124. Temperature controlling devices, such as solid state cooling modules, can also be deployed as needed in order to provide the proper thermal environment for the system.

The system also includes a mosaicing module, not depicted, housed with the computer console 102. The mosaicing module, which will be described in further detail below, provides the system the ability to gather data acquired by the global positioning system 106, the AMU 108, and the camera system 112 and process that data into useable orthomaps.

The system 100 also can include a Self-Locking flight pattern technique that provides the ability to micro-correct the positional accuracy of adjacent flight paths in order to realize precision that exceeds the native precision of the AMU and DGPS sensors alone.

A complete flight planning methodology is used to micro plan all aspects of missions. The inputs are the various mission parameters (latitude/longitude, resolution, color, accuracy, etc.) and the outputs are detailed on-line digital maps and data files that are stored onboard the data collection vehicle and used for real-time navigation and alarms. The ability to interface the flight planning data directly into the autopilot is an additional integrated capability. A computer program may be used that automatically controls the flight path, attitude adjustments, graphical display, moving maps of the vehicle path, checks for alarm conditions and corrective actions, notifies the pilot and/or crew of overall system status, and provides for fail-safe operations and controls. Safe operations parameters may be constantly monitored and reported. Whereas the current system uses a manned crew, the system is designed to perform equally well in an unmanned vehicle.

Figures 3, 4:
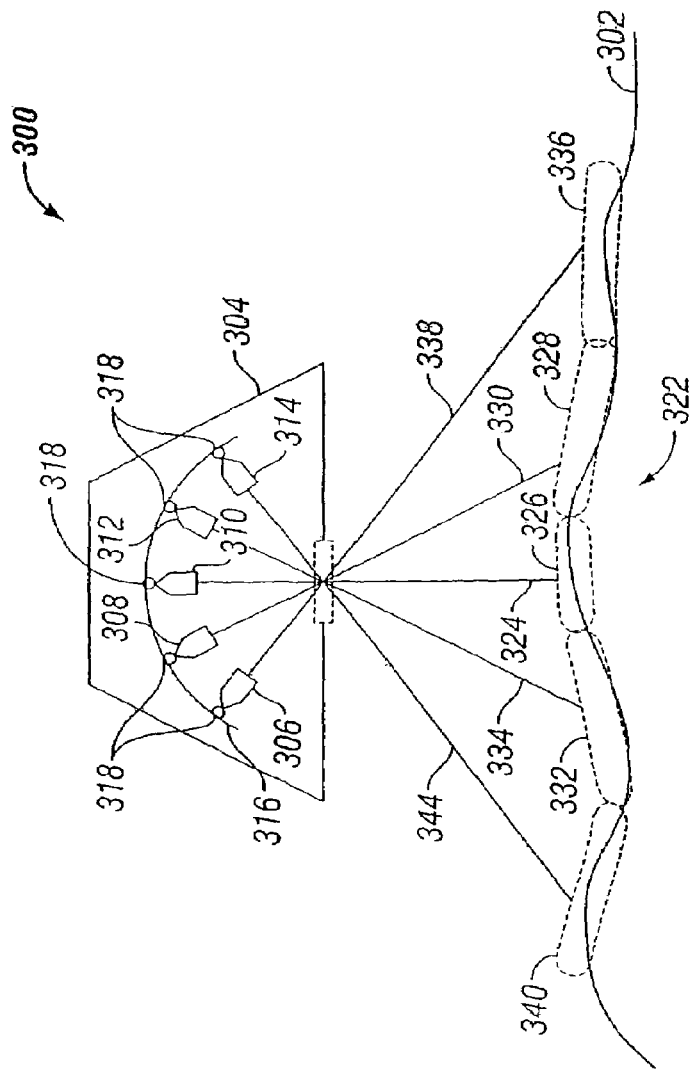
FIG. 3 illustrates a camera array assembly in accordance with certain aspects of the present invention.
FIG. 4 illustrates one embodiment of an imaging pattern retrieved by the camera array assembly of FIG. 1.

FIG. 2 shows another depiction of the present invention. In FIG. 2, the camera array assembly 112 is shown in more detail. As is shown, the camera array assembly 112 allows for images to be acquired from the rear oblique, the forward obliques and the nadir positions. FIG. 3, describes in more detail a camera array assembly of the present invention. FIG. 3 provides a camera array assembly 300 airborne over target 302 (e.g., terrain). For illustrative purposes, the relative size of assembly 300, and the relative distance between it and terrain 302, are not depicted to scale in FIG. 3. The camera array assembly 300 comprises a housing 304 within which imaging sensors 306, 308, 310, 312 and 314 are disposed along a concave curvilinear axis 316. The radius of curvature of axis 316 may vary or be altered dramatically, providing the ability to effect very subtle or very drastic degrees of concavity in axis 316. Alternatively, axis 316 may be completely linear—having no curvature at all. The imaging sensors 306, 308, 310, 312 and 314 couple to the housing 304, either directly or indirectly, by attachment members 318. Attachment members 318 may comprise a number of fixed or dynamic, permanent or temporary, connective apparatus. For example, the attachment members 318 may comprise simple welds, removable clamping devices, or electro-mechanically controlled universal joints.

Additionally, the system 100 may have a real-time, onboard navigation system to provide a visual, bio-feedback display to the vehicle pilot, or remote display in the case of operations in an unmanned vehicle. The pilot is able to adjust the position of the vehicle in real-time in order to provide a more accurate flight path. The pilot may be onboard the vehicle or remotely located and using the flight display to control the vehicle through a communication link.

The system 100 may also use highly fault-tolerant methods that have been developed to provide a software inter-leaved disk storage methodology that allows one or two hard drives to fail and still not lose target data that is stored on the drives. This software inter-leaved disk storage methodology provides superior fault-tolerance and portability versus other, hardware methodologies, such as RAID-5.

The system 100 may also incorporate a methodology that has been developed that allows for a short calibration step just before mission data capture. The calibration methodology step adjusts the camera settings, mainly exposure time, based on sampling the ambient light intensity and setting near optimal values just before reaching the region of interest. A moving average algorithm is then used to make second-by-second camera adjustments in order to deliver improved, consistent photo results. This improves the color processing of the orthomaps. Additionally, the calibration may be used to check or to establish the exact spatial position of each sensor device (cameras, DPG, AMU, EMU, etc.). In this manner, changes that may happen in the spatial location of these devices may be accounted for and maintain overall system precision metrics.

Additionally, the system 100 may incorporate a methodology that has been developed that allows for calibrating the precision position and attitude of each sensor device (cameras, DPG, AMU, EMU, etc.) on the vehicle by flying over an area that contains multiple known, visible, highly accurate geographic positions. A program takes this data as input and outputs the micro positional data that is then used to precisely process the orthomaps.

As depicted in FIG. 3, housing 304 comprises a simple enclosure inside of which imaging sensors 306, 308, 310, 312 and 314 are disposed. Whereas FIG. 3 depicts a 5-camera array, the system works equally well when utilizing any number of camera sensors from 1 to any number. Sensors 306-314 couple, via the attachment members 318, either collectively to a single transverse cross member, or individually to lateral cross members disposed between opposing walls of the housing 304. In alternative embodiments, the housing 304 may itself comprise only a supporting cross member of concave curvature to which the imaging sensors 306 through 314 couple, via members 318. In other embodiments, the housing 304 may comprise a hybrid combination of enclosure and supporting cross member. The housing 304 further comprises an aperture 320 formed in its surface, between the imaging sensors and target 302. Depending upon the specific type of host craft, the aperture 320 may comprise only a void, or it may comprise a protective screen or window to maintain environmental integrity within the housing 304. In the event that a protective transparent plate is used for any sensor, special coatings may be applied to the plate to improve the quality of the sensor data. Optionally, the aperture 320 may comprise a lens or other optical device to enhance or alter the nature of the images recorded by the sensors. The aperture 320 is formed with a size and shape sufficient to provide the imaging sensors 306 through 314 proper lines of sight to a target region 322 on terrain 302.

The imaging sensors 306 through 314 are disposed within or along housing 304 such that the focal axes of all sensors converge and intersect each other within an intersection area bounded by the aperture 320. Depending upon the type of image data being collected, the specific imaging sensors used, and other optics or equipment employed, it may be necessary or desirable to offset the intersection area or point of convergence above or below the aperture 320. The imaging sensors 306 through 314 are separated from each other at angular intervals. The exact angle of displacement between the imaging sensors may vary widely depending upon the number of imaging sensors utilized and on the type of imaging data being collected. The angular displacement between the imaging sensors may also be unequal, if required, so as to provide a desired image offset or alignment. Depending upon the number of imaging sensors utilized, and the particular configuration of the array, the focal axes of all imaging sensors may intersect at exactly the same point, or may intersect at a plurality of points, all within close proximity to each other and within the intersection area defined by the aperture 320.

As depicted in FIG. 3, the imaging sensor 310 is centrally disposed within the housing 304 along axis 316. The imaging sensor 310 has a focal axis 324, directed orthogonally from the housing 304 to align the line of sight of the imaging sensor with the image area 326 of the region 322. The imaging sensor 308 is disposed within the housing 304 along the axis 316, adjacent to the imaging sensor 310. The imaging sensor 308 is aligned such that its line of sight coincides with the image area 328 of the region 322, and such that its focal axis 330 converges with and intersects the axis 324 within the area bounded by the aperture 320. The imaging sensor 312 is disposed within the housing 304 adjacent to the imaging sensor 310, on the opposite side of the axis 316 as the imaging sensor 308. The imaging sensor 312 is aligned such that its line of sight coincides with the image area 332 of the region 322, and such that its focal axis 334 converges with and intersects axes 324 and 330 within the area bounded by the aperture 320. The imaging sensor 306 is disposed within the housing 304 along the axis 316, adjacent to the sensor 308. The imaging sensor 306 is aligned such that its line of sight coincides with the image area 336 of region 322, and such that its focal axis 338 converges with and intersects the other focal axes within the area bounded by aperture 320. The imaging sensor 314 is disposed within housing 304 adjacent to sensor 312, on the opposite side of axis 316 as sensor 306. The imaging sensor 314 is aligned such that its line of sight coincides with image area 340 of region 322, and such that its focal axis 344 converges with and intersects the other focal axes within the area bounded by aperture 320.

The imaging sensors 306 through 314 may comprise a number of digital imaging devices including, for example, individual area scan cameras, line scan cameras, infrared sensors, hyperspectral and/or seismic sensors. Each sensor may comprise an individual imaging device, or may itself comprise an imaging array. The imaging sensors 306 through 314 may all be of a homogenous nature, or may comprise a combination of varied imaging devices. For ease of reference, the imaging sensors 306 through 314 are hereafter referred to as cameras 306 through 314, respectively.

In large-format film or digital cameras, lens distortion is typically a source of imaging problems. Each individual lens must be carefully calibrated to determine precise distortion factors. In one embodiment of this invention, small-format digital cameras having lens angle widths of 17 degrees or smaller are utilized. This alleviates noticeable distortion efficiently and affordably.

Cameras 306 through 314 are alternately disposed within housing 304 along axis 316 such that each camera's focal axis converges upon aperture 320, crosses focal axis 324, and aligns its field of view with a target area opposite its respective position in the array resulting in a "cross-eyed", retinal relationship between the cameras and the imaging target(s). The camera array assembly 300 is configured such that adjoining borders of image areas 326, 328, 332, 336 and 340 overlap slightly.

If the attachment members 318 are of a permanent and fixed nature (e.g., welds), then the spatial relationship between aperture 320, the cameras, and their lines of sight remain fixed as will the spatial relationship between image areas 326, 328, 332, 336 and 340. Such a configuration may be desirable in, for example, a satellite surveillance application where the camera array assembly 300 will remain at an essentially fixed distance from region 322. The position and alignment of the cameras is set such that areas 326, 328, 332, 336 and 340 provide full imaging coverage of region 322. If the attachment members 318 are of a temporary or adjustable nature, however, it may be desirable to selectively adjust, either manually or by remote automation, the position or alignment of the cameras so as to shift, narrow or widen areas 326, 328, 332, 336 and 340—thereby enhancing or altering the quality of images collected by the camera array assembly 300.

In an embodiment, multiple, i.e., at least two, rigid mount units are affixed to the same rigid mount plate. The mount unit is any rigid structure to which at least one imaging sensor may be affixed. The mount unit is preferably a housing, which encloses the imaging sensor, but may be any rigid structure including a brace, tripod, or the like. For the purposes of this disclosure, an imaging sensor means any device capable of receiving and processing active or passive radiometric energy, i.e., light, sound, heat, gravity, and the like, from a target area. In particular, imaging sensors may include any number of digital cameras, including those that utilize a red-blue-green filter, a bushbroom filter, or a hyperspectral filter, LIDAR sensors, infrared sensors, heat-sensing sensors, gravitometers and the like. Imagining sensors do not include attitude measuring sensors such as gyroscopes, GPS devices, and the like devices, which serve to orient the vehicle with the aid of satellite data and/or inertial data. Preferably, the multiple sensors are different.

In the embodiment wherein the imaging sensor is a camera, LIDAR, or the like imaging sensor, the mount unit preferably has an aperture through which light and/or energy may pass. The mount plate is preferably planer, but may be non-planer. In the embodiment, wherein the imaging sensor is a camera, LIDAR, or the like imaging sensor, the mount plate preferably has aperture(s) in alignment with the aperture(s) of the mount unit(s) through which light and/or energy may pass.

A rigid structure is one that flexes less than about $100^{th}$ of a degree, preferably less than about $1,000^{th}$ of a degree, more preferably less than about $10,000^{th}$ of a degree while in use. Preferably, the rigid structure is one that flexes less than about $100^{th}$ of a degree, preferably less than about $1,000^{th}$ of a degree, more preferably less than about $10,000^{th}$ of a degree while secured to an aircraft during normal, i.e., non-turbulent, flight. Objects are rigidly affixed to one another if during normal operation they flex from each other less than about $100^{th}$ of a degree, preferably less than about $1,000^{th}$ of a degree, more preferably less than about $10,000^{th}$ of a degree.

Camera 310 is designated as the principal camera. The image plane 326 of camera 310 serves as a plane of reference. The orientations of the other cameras 306, 308, 312 and 314 are measured relative to the plane of reference. The relative orientations of each camera are measured in terms of the yaw, pitch and roll angles required to rotate the image plane of the camera to become parallel to the plane of reference. The order of rotations is preferably yaw, pitch, and roll.

The imaging sensors affixed to the mount unit(s) may not be aligned in the same plane. Instead, the angle of their mount relative to the mount angle of a first sensor affixed to the first mount unit, preferably the principle nadir camera of the first mount unit, may be offset. Accordingly, the imaging sensors may be co-registered to calibrate the physical mount angle offset of each imaging sensor relative to each other. In an embodiment, multiple, i.e., at least two, rigid mount units are affixed to the same rigid mount plate and are co-registered. In an embodiment, the cameras 306 through 314 are affixed to a rigid mount unit and co-registered. In this embodiment, the geometric centerpoint of the AMU, preferably a gyroscope, is determined using GPS and inertial data. The physical position of the first sensor affixed to the first mount unit, preferably the principle nadir camera of the first mount unit, is calculated relative to a reference point, preferably the geometric centerpoint of the AMU. Likewise, the physical position of all remaining sensors within all mount units are calculated—directly or indirectly—relative to the same reference point.

The boresight angle of a sensor is defined as the angle from the geometric center of that sensor to a reference plane. Preferably the reference plane is orthogonal to the target area. The boresight angle of the first sensor may be determined using the ground target points. The boresight angles of subsequent sensors are preferably calculated with reference to the boresight angle of the first sensor. The sensors are preferably calibrated using known ground targets, which are preferably photo-identifiable, and alternatively calibrated using a self-locking flight path or any other method as disclosed in U.S. Publication No. 2004/0054488A1, the disclosure of which is hereby incorporated by reference in full.

The imaging sensor within the second mount unit may be any imaging sensor, and is preferably a LIDAR. Alternative, the second imaging sensor is a digital camera, or array of digital cameras. In an embodiment, the boresight angle of the sensor(s) affixed to the second mount unit are calculated with reference to the boresight angle of the first sensor. The physical offset of the imaging sensor(s) within the second mount unit may be calibrated with reference to the boresight angle of the first sensor within the first mount unit.

In this manner, all of the sensors are calibrated at substantially the same epoch, using the same GPS signal, the same ground target(s), and under substantially the same atmospheric conditions. This substantially reduces compounded error realized when calibrating each sensor separately, using different GPS signals, against different ground targets, and under different atmospheric conditions.

Referring now to FIG. 4, images of areas 336, 328, 326, 332 and 340 taken by cameras 306 through 314, respectively, are illustrated from an overhead view. Again, because of the "cross-eyed" arrangement, the image of area 336 is taken by camera 306, the image of area 340 is taken by camera 314, and so on. In one embodiment of the present invention, images other than those taken by the center camera 310 take on a trapezoidal shape after perspective transformation. Cameras 306 through 314 form an array along axis 316 that is, in most applications, pointed down vertically. In an alternative embodiment, a second array of cameras, configured similar the array of cameras 306 through 314, is aligned with respect to the first array of cameras to have an oblique view providing a "heads-up" perspective. The angle of declination from horizontal of the heads-up camera array assembly may vary due to mission objectives and parameters but angles of 25-45 degrees are typical. Other alternative embodiments, varying the mounting of camera arrays, are similarly comprehended by the present invention. In all such embodiments, the relative positions and attitudes of the cameras are precisely measured and calibrated so as to facilitate image processing in accordance with the present invention.

In one embodiment of the present invention, an external mechanism (e.g., a GPS timing signal) is used to trigger the cameras simultaneously thereby capturing an array of input images. A mosaicing module then renders the individual input images from such an array into an ortho-rectified compound image (or "mosaic"), without any visible seams between the adjacent images. The mosaicing module performs a set of tasks comprising: determining the geographical boundaries and dimensions of each input image; projecting each input image onto the mosaic with accurate geographical positioning; balancing the color of the images in the mosaic; and blending adjacent input images at their shared seams. The exact order of the tasks performed may vary, depending upon the size and nature of the input image data. In certain embodiments, the mosaicing module performs only a single transformation to an original input image during mosaicing. That transformation can be represented by a 4×4 matrix. By combining multiple transformation matrices into a single matrix, processing time is reduced and original input image sharpness is retained.

During mapping of the input images to the mosaic, especially when mosaicing is performed at high resolutions, pixels in the mosaic (i.e., output pixels) may not be mapped to by any pixels in the input images (i.e., input pixels). Warped lines could potentially result as artifacts in the mosaic. Certain embodiments of the present invention overcome this with a super-sampling system, where each input and output pixel is further divided into an n×m grid of sub-pixels. Transformation is performed from sub-pixels to sub-pixels. The final value of an output pixel is the average value of its sub-pixels for which there is a corresponding input sub-pixel. Larger n and m values produce mosaics of higher resolution, but do require extra processing time.

During its processing of image data, the mosaicing module may utilize the following information: the spatial position (e.g., x, y, z coordinates) of each camera's focal point at the time an input image is captured; the attitude (i.e., yaw, pitch, roll) of each camera's image plane relative to the target region's ground plane at the time an input image was captured; each camera's fields of view (i.e., along track and cross track); and the Digital Terrain Model (DTM) of the area. The attitude can be provided by the AMUs associated with the system. Digital terrain models (DTMs) or Digital surface models (DSMs) can be created from information obtained using a LIDAR module 118. LIDAR is similar to the more familiar radar, and can be thought of as laser radar. In radar, radio waves are transmitted into the atmosphere that scatters some of the energy back to the radar's receiver. LIDAR also transmits and receives electromagnetic radiation, but at a higher frequency since it operates in the ultraviolet, visible and infrared region of the electromagnetic spectrum. In operation, LIDAR transmits light out to a target area. The transmitted light interacts with and is changed by the target area. Some of this light is reflected/scattered back to the LIDAR instrument where it can be analyzed. The change in the properties of the light enables some property of the target area to be determined. The time for the light to travel out to the target area and back to LIDAR device is used to determine the range to the target.

DTM and DSM data sets can also be captured from the camera array assembly. Traditional means of obtaining elevation data may also be used such as stereographic techniques.

There are presently three basic types of LIDAR: Range finders, Differential Absorption LIDAR (DIAL) and Doppler LIDAR. Range finder LIDAR is the simplest LIDAR and is used to measure the distance from the LIDAR device to a solid or hard target. DIAL LIDAR is used to measure chemical concentrations (such as ozone, water vapor, pollutants) in the atmosphere. A DIAL LIDAR uses two different laser wavelengths that are selected so that one of the wavelengths is absorbed by the molecule of interest while the other wavelength is not. The difference in intensity of the two return signals can be used to deduce the concentration of the molecule being investigated. Doppler LIDAR is used to measure the velocity of a target. When the light transmitted from the LIDAR hits a target moving towards or away from the LIDAR, the wavelength of the light reflected/scattered off the target will be changed slightly. This is known as a Doppler-shift and therefore Doppler LIDAR. If the target is moving away from the LIDAR, the return light will have a longer wavelength (sometimes referred to as a red shift), if moving towards the LIDAR the return light will be at a shorter wavelength (blue shifted). The target can be either a hard target or an atmospheric target (e.g. microscopic dust and aerosol particles that are carried by the wind.

A camera's focal point is preferably used as a perspective transformation center. Its position in space may be determined, for example, by a multi-frequency carrier phase post-processed GPS system mounted on the host craft. The offsets, in three dimensions, of a camera's focal point are preferably carefully measured against the center of the GPS antenna. These offsets may be combined with the position of the GPS antenna, and the orientation of the host craft, to determine the exact position of the camera's focal point. The position of the GPS antenna is preferably determined by processing of collected GPS data against similar ground-based GPS antennas deployed at precisely surveyed points.

One or more AMUs (e.g., the Applanix POS AV) are preferably mounted onboard for attitude determination. The attitude of the AMU reference plane relative to the target region's ground plane is preferably measured and recorded at short intervals, with accuracy better than one-hundredth of one degree. The attitude of the AMU reference plane may be defined as the series of rotations that can be performed on the axes of this plane to make it parallel to the ground plane. The term "align" could also be used to describe this operation.

The attitude of center camera 310 (i.e. its image plane), relative to the AMU, is preferably precisely calibrated. The attitude of each of the other cameras, relative to center camera 310, is preferably also be carefully calibrated. This dependent calibration is more efficient than directly calibrating each camera. When the camera array assembly 300 is remounted, only center camera 310 needs to be recalibrated. Effectively, a series of two transformations is applied to an input image from center camera 310. First, the center camera's image plane is aligned to the AMU plane. Then, the AMU plane is aligned again to the ground plane. These transformations, however, combine into a single operation by multiplying their respective transformation matrices. For images from each of the other cameras, an additional transformation is first performed to align it with the center camera's image plane.

The position of the focal point of center camera 310 may be determined as described above. The x and y components of this position preferably determine the position of the mosaic's nadir point 400 on the ground. Field of view (FOV) angles of each camera are known, thus the dimensions of each input image may be determined by the z component of that camera's focal point. An average elevation of the ground is preferably determined by computing the average elevation of points in the DTMs of the area, and then each input image is projected to an imaginary horizontal plane at this elevation. Relief displacement is then preferably applied using the DTMs of the area. The DTMs can be obtained from many sources including: the USGS 30- or 10-meter DTMs available for most of the US; commercial DTMs; or DTMs obtained by a LIDAR or SAR EMU device mounted on the host craft that captures data concurrently with the cameras.

Besides being geographically correctly placed, the resulting compound image also needs to have radiometric consistency throughout, and no visible seams at the joints between two adjacent images. The present invention provides a number of techniques for achieving this goal.

A characteristic of a conventional camera is the exposure time (i.e., the time the shutter is open to collect light onto the image plane). The longer the exposure time, the lighter the resultant image becomes. Exposure time must adapt to changes in ambient lighting caused by conditions such as: cloud coverage; the angle and position of the sun relative to the camera; and so forth. Optimal exposure time may also depend on a camera's orientation with respect to lighting sources (e.g., cameras pointing towards a sunlit object typically receive more ambient light than those pointing towards a shaded object). Exposure time is adjusted to keep the average intensity of an image within a certain desired range. For example, in 24-bit color images each Red, Green and Blue component can have intensity values from 0 to 255. In most instances, however, it is desirable to keep the average intensity at a mean value (i.e., 127).

In the present invention, an exposure control module controls exposure time for each of the cameras or imaging sensors. It examines each input image and calculates average image intensity. Based on a moving average (i.e., average intensity of the last X number of images), the exposure control module determines whether to increase or decrease exposure time. The module can use a longer running average to effect a slower reaction to changes in lighting conditions, with less susceptibility to unusually dark or light images (e.g., asphalt roads or water). The exposure control module controls exposure time for each camera separately.

In systems where cameras are mounted without forward-motion compensation mechanisms, there must be a maximum limit for exposure time. Setting exposure time to a value larger than the maximum may cause motion-induced blurriness. For example, assume cameras are mounted on an airplane traveling at 170 miles/hour (or about 3 inches/ms). Assume desired pixel resolution is 6 inches. Forward motion during image capture should be limited to half a pixel size—which in this case equals 3 inches. Thus, maximum exposure for example is 1 millisecond.

In controlling imaging quality, it is useful to be able to determine if changes in light intensity are caused either due to a change in ambient light or due to the presence of unusually light or dark objects (e.g., reflecting water body, metal roofs, asphalts, etc.). Certain applications of this invention involve aerial photography or surveillance. It is observed that aerial images of the ground usually contain plants and vegetation—which have more consistent reflectivity than water bodies or man-made structures such as roads and buildings. Of course, images of plants and vegetation are usually green-dominant (i.e., the green component is the greatest of the red, green and blue values). Therefore, intensity correlation can be made more accurate by focusing on the green-dominant pixels.

The exposure control module computes the average intensity of an image by selecting only green-dominant pixels. For example, if an image has 1 million pixels and 300,000 are green-dominant, only those 300,000 green-dominant pixels are included in the calculation of average intensity. This results in an imaging process that is less susceptible to biasing caused by man-made structures and water bodies, whose pixels are usually not green-dominant. As previously noted, it is desirable to maintain an intensity value of about 127. When intensity value is over 127 (i.e., over-exposed), exposure time is reduced so that less light is captured. Similarly, when intensity value is under 127 (i.e., under-exposed), exposure time is increased so that more light is captured. For example, consider a system flying over a target terrain area having many white roofs, whose intensities are very high. Average intensity for the images captured would tend to be high. In most conventional systems, exposure time would by reduced in order to compensate. In such an example, however, reducing exposure time is not proper, because the average intensity of the images has been biased by the bright roofs. Reducing exposure time would result in images where the ground is darker than it should be. In contrast, if only green-dominant pixels are processed in accordance with the present invention, then pixels representing the overly bright roofs do bias the average intensity and the exposure time is not changed.

Thus, the exposure control module reduces intensity differences between input images. Nonetheless, further processing is provided to enhance tonal balance. There are a number of factors (e.g., lens physics, atmospheric conditions, spatial/positional relationships of imaging devices) that cause an uneven reception of light from the image plane. More light is received in the center of a camera or sensor than at the edges.

Figure 5:
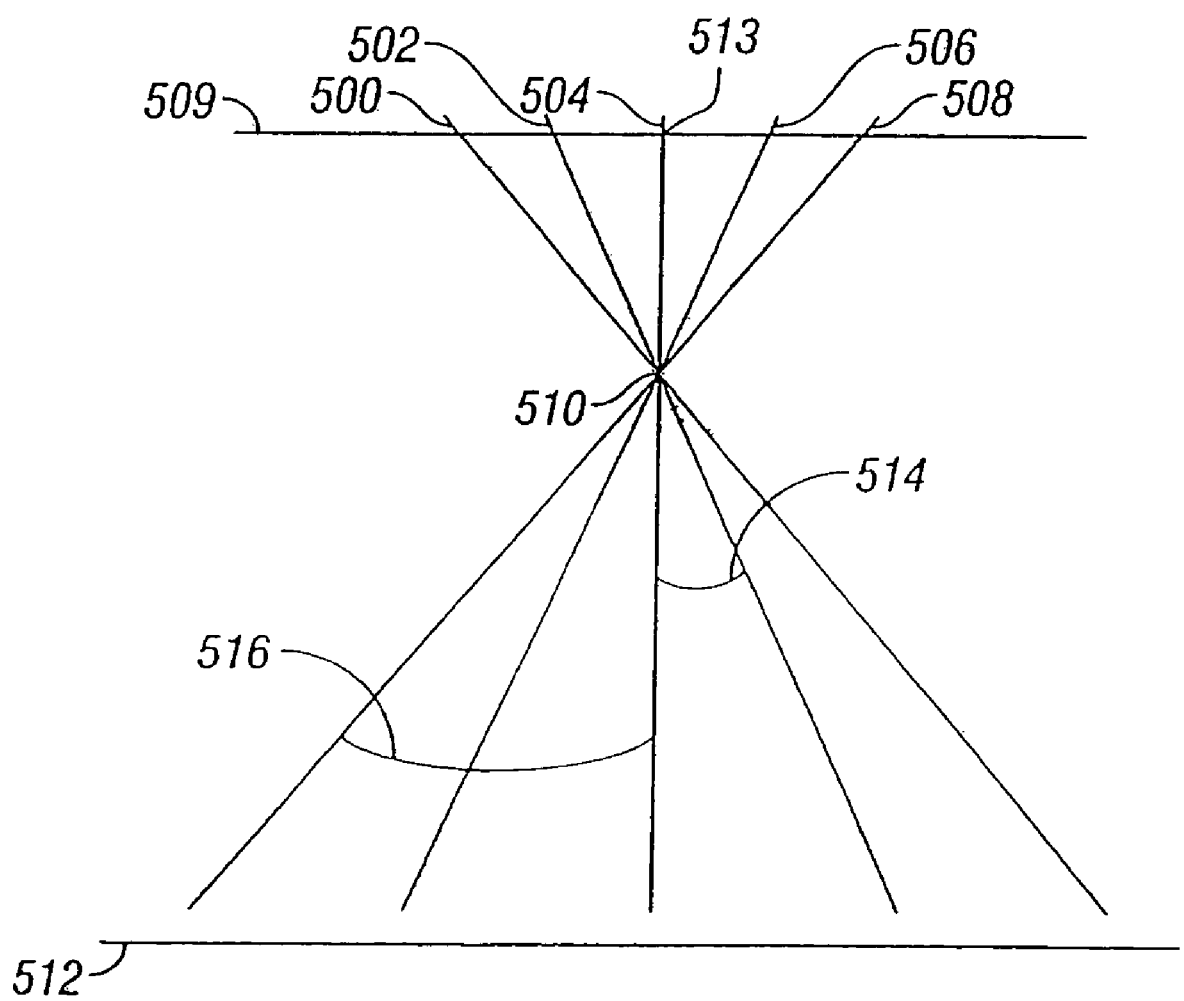
FIG. 5 depicts an imaging pattern illustrating certain aspects of the present invention.

The mosaicing module of the present invention addresses this with an anti-vignetting function, illustrated in reference now to FIG. 5. A number of focal columns 500, 502, 504, 506 and 508 converge from image plane 509 and cross through focal point 510 as they range across imaging target area 512 (e.g., ground terrain). Columns 500 through 508 may comprise individual resolution columns of a single camera or sensor, or may represent the focal axes of a number of independent cameras or sensors. For reference purposes, column 504 serves as the axis and point 513 at which column 504 intersects image plane 509 serves as a principal point. The exposure control module applies an anti-vignetting function multiplying the original intensity of an input pixel with a column-dependent anti-vignetting factor. Because the receiving surface is represented as a plane with a coordinate system, each column will have a number of resolution rows (not shown). This relationship may be expressed, for a pixel p at column x and row y, as follows:

<adjusted intensity>=<original intensity>*ƒ(x);

where ƒ(x) is a function of the form:

ƒ(x)=cos(off-axis angle)**4.

The off-axis angle 514 is: zero for center column 504; larger for columns 502 and 506; and larger still for columns 500 and 508. The overall field of view angle 516 (FOVx angle) is depicted between columns 504 and 508.

The function ƒ(x) can be approximated by a number of line segments between columns. For a point falling within a line segment between any given columns c1 and c2, an adjustment factor is computed as follows:

<adjustment factor for c>=ƒ(c1)+[ƒ(c2)−ƒ(c1)*(c−c1)/(c2−c1)];

where ƒ(c1) and ƒ(c2) are the ƒ function values of the off-axis angles at column c1 and c2, respectively.

Each set of input images needs to be stitched into a mosaic image. Even though the exposure control module regulates the amount of light each camera or sensor receives, the resulting input images may still differ in intensity. The present invention provides an intensity-balancing module that compares overlapping area between adjacent input images, to further balance the relative intensities. Because adjoining input images are taken simultaneously, the overlapping areas should, in theory, have identical intensity in both input images. However, due to various factors, the intensity values are usually not the same. Some such factors causing intensity difference could include, for example, the exposure control module being biased by unusually bright or dark objects present in the field of view of only a particular camera, or the boresight angles of cameras being different (i.e., cameras that are more slanted receive less light than those more vertical).

To balance two adjacent images, one is chosen as the reference image and the other is the secondary image. A correlation vector (fR, fG, FB) is determined using, for example, the following process. Let V be a 3×1 vector representing the values (R, G and B) of a pixel:

$$V = \begin{matrix} R \\ G \\ B \end{matrix}.$$

A correlation matrix C may be derived as:

$$C = \begin{matrix} FR & 0 & 0 \\ 0 & FG & 0 \\ 0 & 0 & FB \end{matrix};$$

where FR=AvgIr/AvgIn; AvgIr=Red average intensity of overlapped region in reference image; AvgIn=Red average intensity of overlapped region in new image; and FG and FB are similarly derived.

The correlation matrix scales pixel values of the secondary image so that the average intensity of the overlapping area of the secondary image becomes identical to the average intensity of the overlapping area of the reference image. The second image can be balanced to the reference image by multiplying its pixel values by the correlation matrix.

Thus, in one embodiment of a balancing process according to the present invention, a center image is considered the reference image. The reference image is first copied to the compound image (or mosaic). Overlapping areas between the reference image and an adjoining image (e.g., the near left image) are correlated to compute a balancing correlation matrix (BCM). The BCM will be multiplied with vectors representing pixels of the adjoining image to make the intensity of the overlapping area identical in both images. One embodiment of this relationship may be expressed as:

Let I(center)=Average intensity of overlapping area in center image;

I(adjoining)=Average intensity of overlap in adjoining image; then

Balancing factor=I(center)/I(adjoining).

The balancing factor for each color channel (i.e., red, green and blue) is independently computed. These three values form the BCM. The now-balanced adjoining image is copied to the mosaic. Smooth transitioning at the border of the copied image is providing by "feathering" with a mask. This mask has the same dimension as the adjoining image and comprises a number of elements. Each element in the mask indicates the weight of the corresponding adjoining image pixel in the mosaic. The weight is zero for pixels at the boundary (i.e. the output value is taken from the reference image), and increases gradually in the direction of the adjoining image until it becomes unity—after a chosen blending width has been reached. Beyond the blending area, the mosaic will be entirely determined by the pixels of the adjoining image. Similarly, the overlaps between all the other constituent input images are analyzed and processed to compute the correlation vectors and to balance the intensities of the images.

Figure 6:
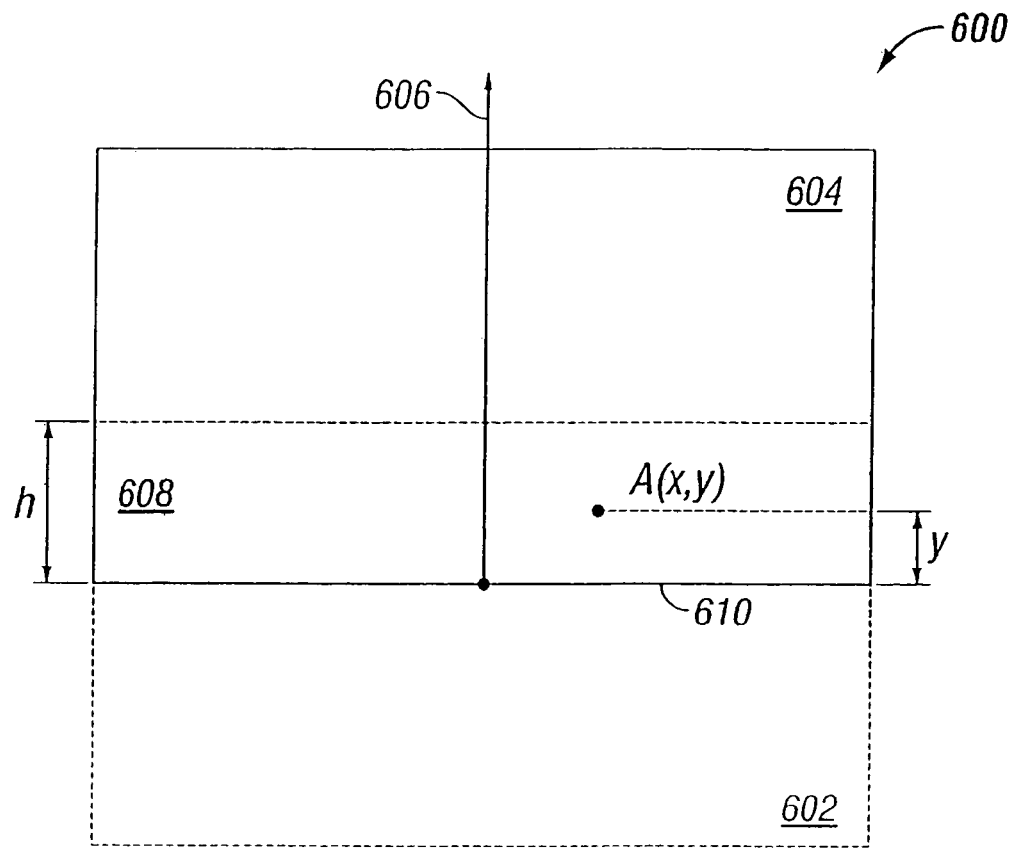
FIG. 6 illustrates an image strip in accordance with the present invention.

A correlation matrix is determined using, for example, the following process with reference to FIG. 6. FIG. 6 depicts a strip 600 being formed in accordance with the present invention. A base mosaic 602 and a new mosaic 604, added along path (or track) 606, overlap each other in region 608. Let V be a vector that represents the R, G and B values of a pixel:

$$V = \begin{matrix} R \\ G \\ B \end{matrix}$$

Let h be the transition width of region 608, and y be the along-track 606 distance from the boundary 610 of the overlapped region to a point A, whose pixel values are represented by V.

Let C be the correlation matrix:

$$C = \begin{matrix} FR & 0 & 0 \\ 0 & FG & 0 \\ 0 & 0 & FB \end{matrix}$$

The balanced value of V, called V' is:

$$V' = [y/h.I + (1-y/h).C] \times V, \text{ for } 0 < y < h;$$

$$V' = V, \text{ for } y >= h;$$

Where I is the identity matrix $$I = \begin{matrix} 1 & 0 & 0 \\ 0 & 1 & 0 \\ 0 & 0 & 1 \end{matrix}.$$

Note that the "feathering" technique is also used in combination with the gradient to minimize seam visibility.

When mosaics are long, differences in intensity at the overlap may change from one end of the mosaic to the other. Computing a single correlation vector to avoid creating visible seams may not be possible. The mosaic can be divided into a number of segments corresponding to the position of the original input images that make up the mosaic. The process described above is applied to each segment separately to provide better local color consistency.

Under this refined algorithm, pixels at the border of two segments may create vertical seams (assuming north-south flight lines). To avoid this problem, balancing factors for pixels in this area have to be "transitioned" from that of one segment to the other. This is explained now with reference to FIG. 7.

Figure 7:
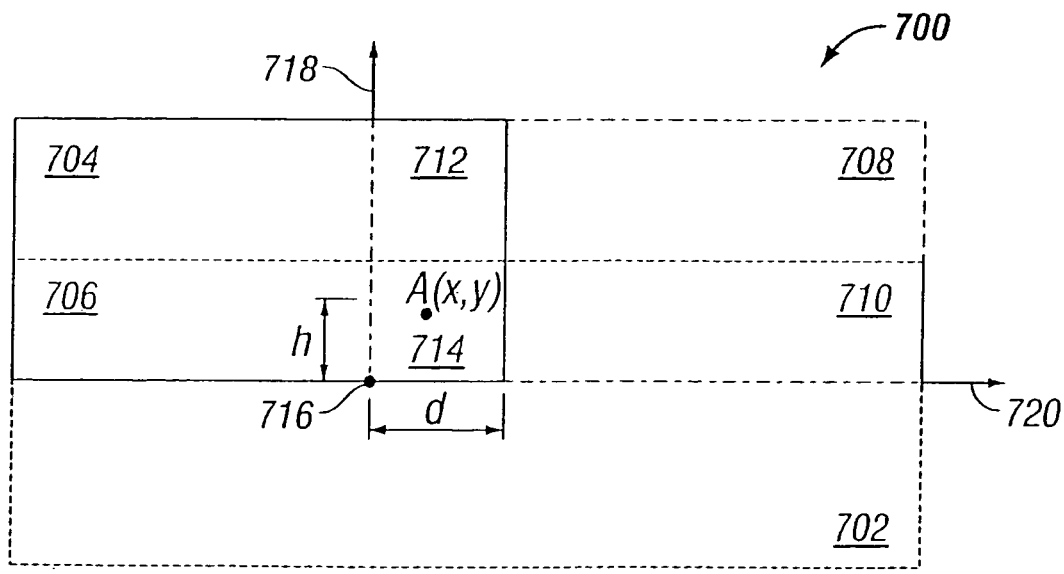
FIG. 7 illustrates another embodiment of an image strip in accordance with the present invention.

FIG. 7 depicts a strip 700 being formed in accordance with the present invention. A base mosaic 702 and a new segment 704 overlap in area 706. Mosaic 702 and another new segment 708 overlap in area 710. Segments 704 and 708 overlap in area 712, and areas 706, 710 and 712 all overlap and coincide at area 714. For explanation purposes, point 716 serves as an origin for y-axis 718 and x-axis 720. Movement along y-axis 718 represents movement along the flight path of the imaging system. Point 716 is located at the lower left of area 714.

According to the present invention, the dimensions of a strip are determined by the minimum and maximum x and y values of the constituent mosaics. An output strip is initialized to a background color. A first mosaic is transferred to the strip. The next mosaic (along the flight path) is processed next. Intensity values of the overlapping areas of the new mosaic and the first mosaic are correlated, separately for each color channel. The new mosaic is divided into a number of segments corresponding to the original input images that made up the mosaic. A mask matrix, comprising a number of mask elements, is created for the new mosaic. A mask element contains the correlation matrix for a corresponding pixel in the new mosaic. All elements in the mask are initialized to unity. The size of the mask can be limited to just the transition area of the new mosaic. The correlation matrix is calculated for the center segment. The mask area corresponding to the center segment is processed. The values of the elements at the edge of the overlap area are set to the correlation vector. Then, gradually moving away from the first mosaic along the strip, the components of the correlation matrix are either increased or decreased (whether they are less or more than unity, respectively) until they become unity at a predetermined transition distance. The area of the mask corresponding to a segment adjoining the center segment is then processed similarly. However, the area 814 formed by the first mosaic and the center and adjoining segments of the new image requires special treatment. Because the correlation matrix for the adjoining segment may not be identical to that of the center segment, a seam may appear at the border of the two segments in the overlap area 714 with the first mosaic. Therefore, the corner is influenced by the correlation matrices from both segments. For a mask cell A at distance x to the border with the center segment and distance y to the overlap edge, its correlation matrix is the distance-weighted average of the two segments, evaluated as follows:

For pixel A(x, y) in area 714 at distance x to the border with the center segment, its balanced values are computed as the distance-weighted averages of the values computed using the two segments;

V1 is the balanced RGB vector based on segment 704;

V2 is the balanced RGB vector based on segment 708;

V' is the combined (final) balanced RGB vector $$V'=((d-x)/d).V1+(x/d).V2;$$

Where x-axis is the line going through bottom of overlapped region;

y-axis is the line going through the left side of the overlapped region between segments 704 and 708;

h is the transition width; and d is the width of the overlapped region between segments 704 and 708.

The mask areas corresponding to other adjoining segments are computed similarly.

Further according to the present invention, a color fidelity (i.e., white-balance) filter is applied. This multiplies R and B components with a determinable factor to enhance color fidelity. The factor may be determined by calibrating the cameras and lenses. The color fidelity filter ensures that the colors in an image retain their fidelity, as perceived directly by the human eye. Within the image capture apparatus, the Red, Green and Blue light receiving elements may have different sensitivities to the color they are supposed to capture. A "while-balance" process is applied—where image of a white object is captured. Theoretically, pixels in the image of that white object should have equivalent R, G and B values. In reality, however, due to different sensitivities and other factors, the average color values for each R, G and B may be avgR, avgG and avgB, respectively. To equalize the color components, the R, G and B values of the pixels are multiplied by the following ratios:

R values are multiplied by the ratio avgG/avgR; and

B values are multiplied by the ratio avgG/avgB.

The end result is that the image of the white object is set to have equal R G B components.

In most applications, a strip usually covers a large area of non-water surface. Thus, average intensity for the strip is unlikely to be skewed by anomalies such as highly reflecting surfaces. The present invention provides an intensity normalization module that normalizes the average intensity of each strip so that the mean and standard deviation are of a desired value. For example, a mean of 127 is the norm in photogrammetry. A standard deviation of 51 helps to spread the intensity value over an optimal range for visual perception of image features. Each strip may have been taken in different lighting conditions and, therefore, may have different imaging data profiles (i.e., mean intensity and standard deviation). This module normalizes the strips, such that all have the same mean and standard deviation. This enables the strips to be stitched together without visible seams.

This intensity normalization comprises a computation of the mean intensity for each channel R, G and B, and for all channels. The overall standard deviation is then computed. Each R, G and B value of each pixel is transformed to the new mean and standard deviation:

new value=new mean+(old value−old mean)*(new std/old std).

Next, multiple adjacent strips are combined to produce tiled mosaics for an area of interest. Finished tiles can correspond to the USGS quads or quarter-quads. Stitching strips into mosaics is similar to stitching mosaics together to generate strips, with strips now taking the role of the mosaics. At the seam line between two strips, problems may arise if the line crosses elevated structures such as buildings, bridges, etc. This classic problem in photogrammetry arises from the parallax caused by the same object being looked at from two different perspectives. During imaging of a building, for example, one strip may present a view from one side of the building while another strip presents a view from another side of the building. After the images are stitched together, the resulting mosaic may look like a teepee. In order to address this, a terrain-guided mosaicing process may be implemented to guide the placement of a seam line. For example, LIDAR or DEM data collected with, or analyzed from, image data may be processed to determine the configuration and shaping of images as they are mosaiced together. Thus, in some mosaiced images, a seam line may not be a straight line—instead comprising a seam line that shifts back and forth to snake through elevated structures.

Figure 8:
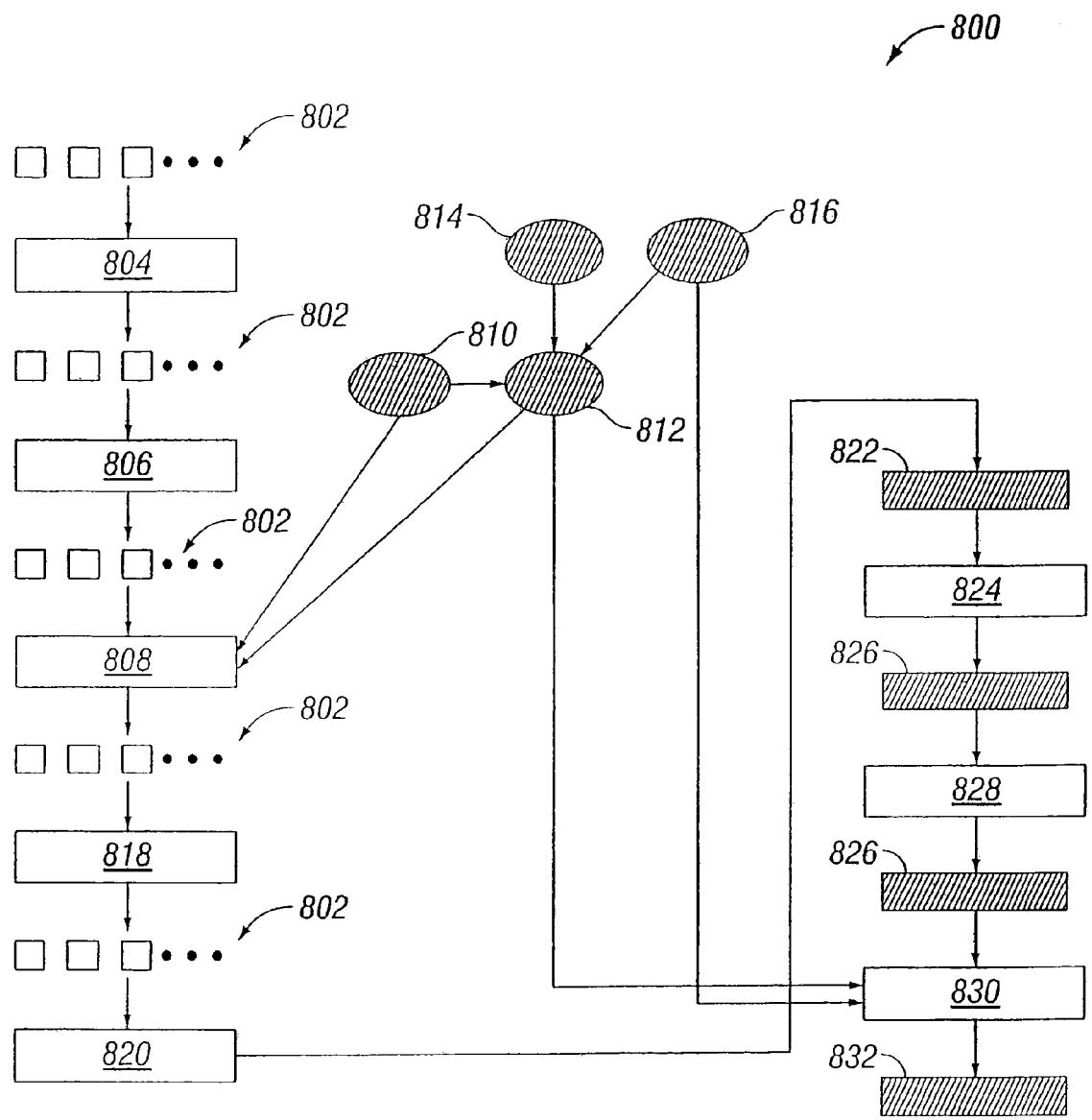
FIG. 8 illustrates one embodiment of an imaging process in accordance with the present invention.

Referring now to FIG. 8, one embodiment of an imaging process 800 is illustrated in accordance with the present invention as described above. Process 800 begins with a series 802 of one, or more, raw collected images. Images 802 are then processed through a white-balancing process 804, transforming them into a series of intermediate images. Series 802 is then processed through anti-vignetting function 806 before progressing to the orthorectification process 808. As previously noted, orthorectification may rely on position and attitude data 810 from the imaging sensor system or platform, and on DTM data 812. DTM data 812 may be developed from position data 810 and from, for example, USGS DTM data 814 or LIDAR data 816. Series 802 is now orthorectified and processing continues with color balancing 818. After color balancing, series 802 is converted by mosaicing module 820 into compound image 822. Module 820 performs the mosaicing and feathering processes during this conversion. Now, one or more compound images 822 are further combined in step 824, by mosaicing with a gradient and feathering, into image strip 826. Image strips are processed through intensity normalization 828. The now normalized strips 828 are mosaiced together in step 830, again by mosaicing with a gradient and feathering, rendering a finishing tiled mosaic 832. The mosaicing performed in step 830 may comprise a terrain-guided mosaicing, relying on DTM data 812 or LIDAR data 816.

Figure 9:
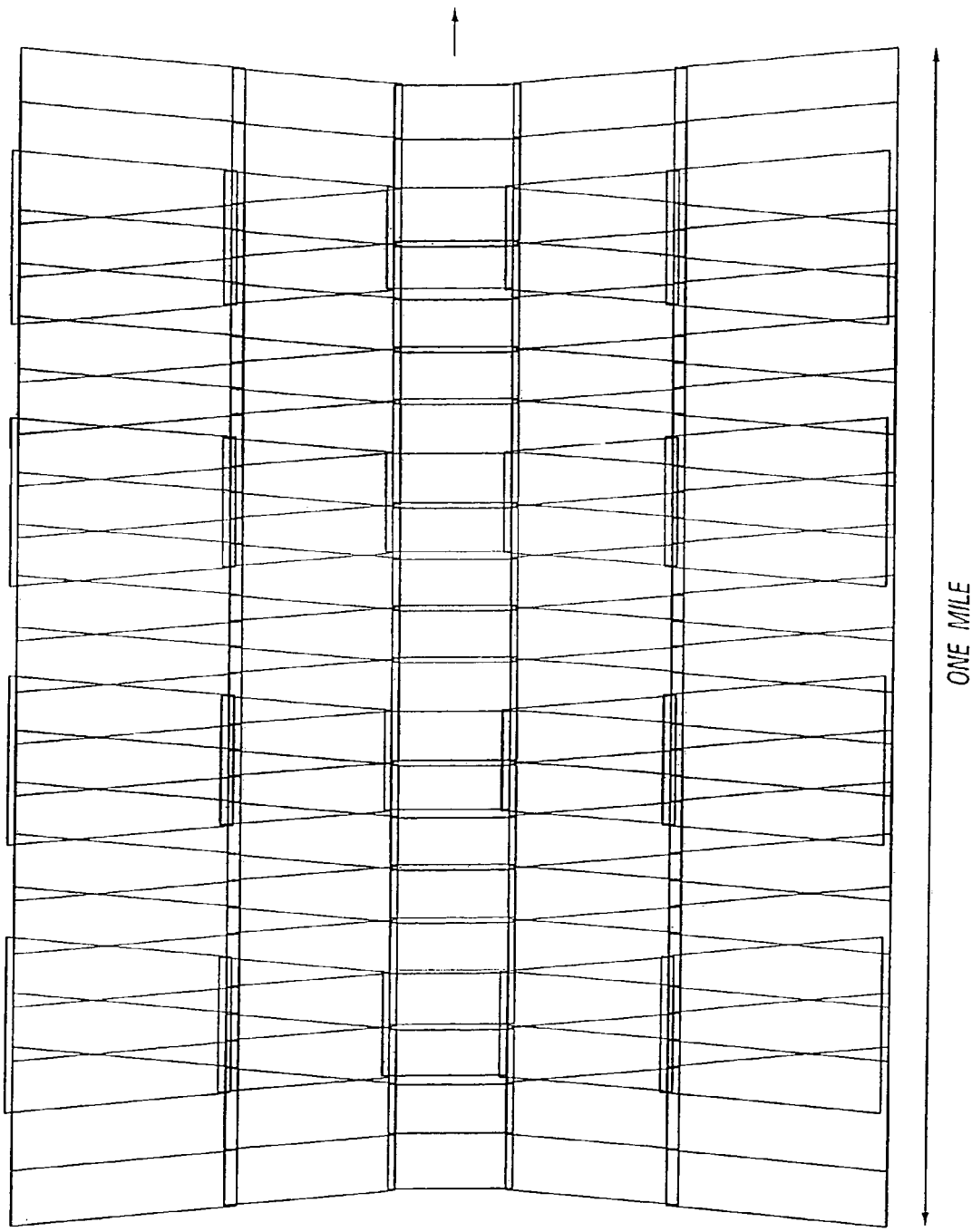
FIG. 9 illustrates diagrammatically how photos taken with the camera array assembly can be aligned to make an individual frame.

FIG. 9 illustrates diagrammatically how photos taken with the camera array assembly may be aligned to make an individual frame. This embodiment shows a photo patter illustration looking down from a vehicle, using data ortho-rectified from five cameras.

Figure 10:
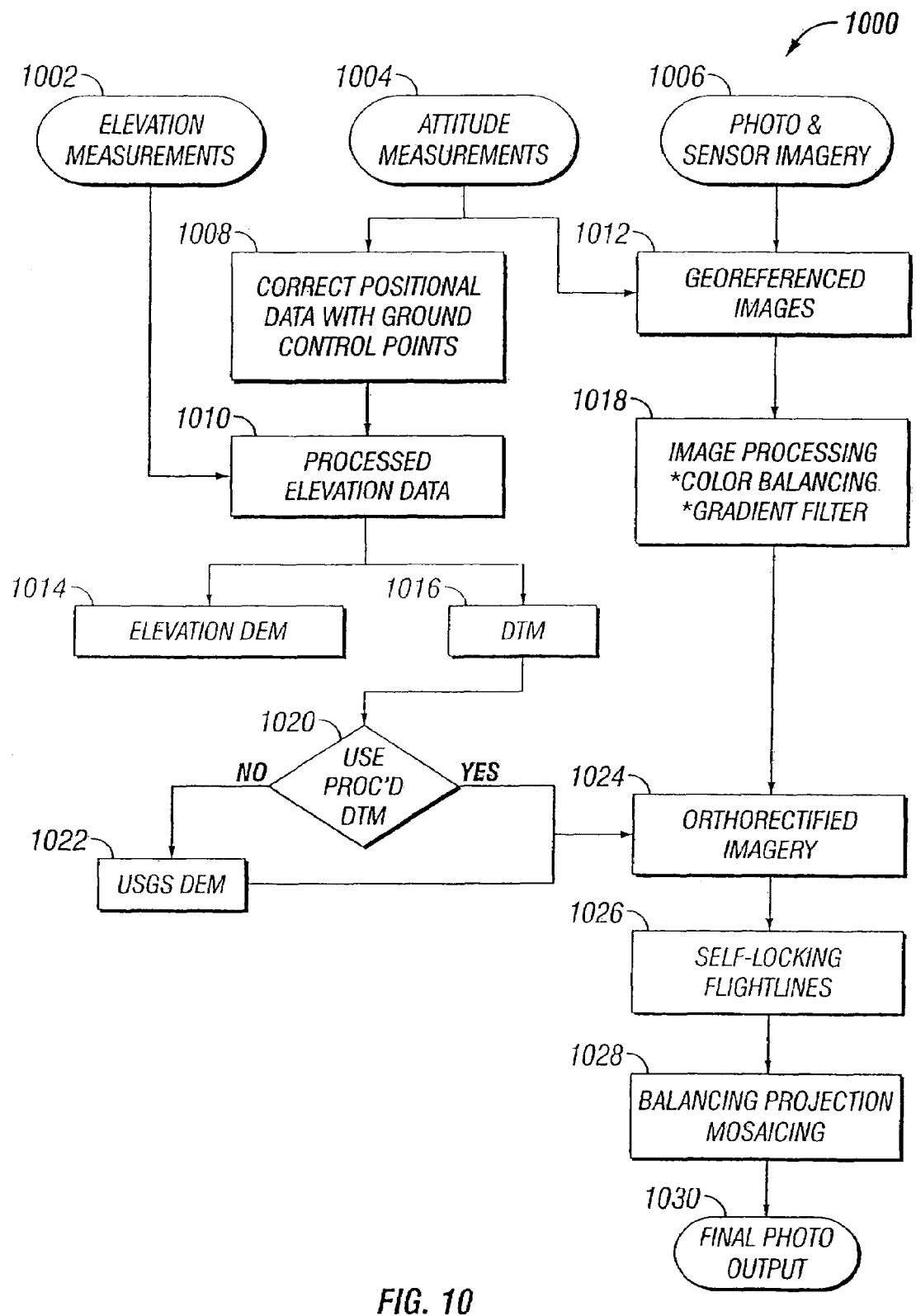
FIG. 10 is a block diagram of the processing logic according to certain embodiments of the present invention.

FIG. 10 is a block diagram of the processing logic according to certain embodiments of the present invention. As shown in block diagram 1000, the processing logic accepts one or more inputs, which may include elevation measurements 1002, attitude measurements 1004 and/or photo and sensor imagery 1006. Certain inputs may be passed through an initial processing step prior to analysis, as is shown in block 1008, wherein the attitude measurements are combined with data from ground control points. Elevation measurements 1002 and attitude measurements 1004 may be combined to generate processed elevation data 1010. Processed elevation data 1010 may then be used to generate elevation DEM 1014 and DTM 1016. Similarly, attitude measurements 1006 may be combined with photo and sensor imagery 1006 to generate georeferenced images 1012, which then undergo image processing 1018, which may include color balancing and gradient filtering.

Depending on the data set to be used (1020), either DTM 1016 or a USGS DEM 1022 is combined with processed images 1018 to generate orthorectified imagery 1024. Orthorectified imagery 1024 then feeds into self-locking flightlines 1026. Balancing projection mosaicing 1028 then follows, to generate final photo output 1030.

Figure 11:
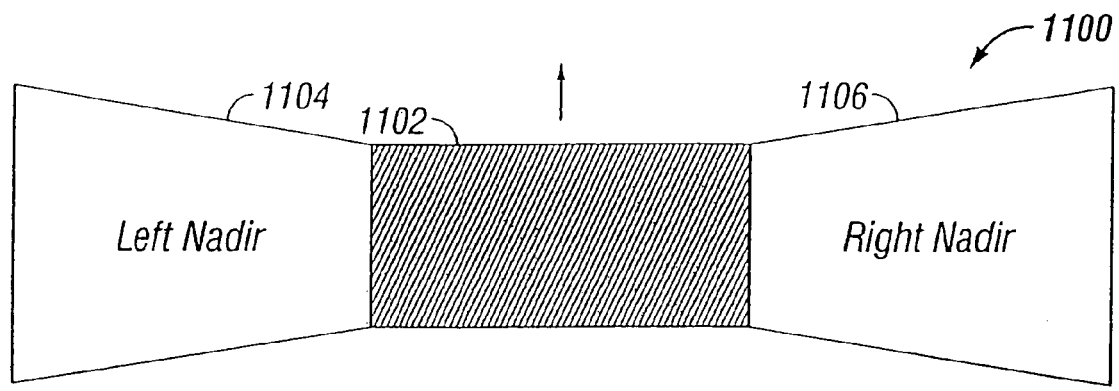
FIG. 11 is an illustration of lateral oversampling looking down from a vehicle according to certain embodiments of the present invention.
Figure 12:
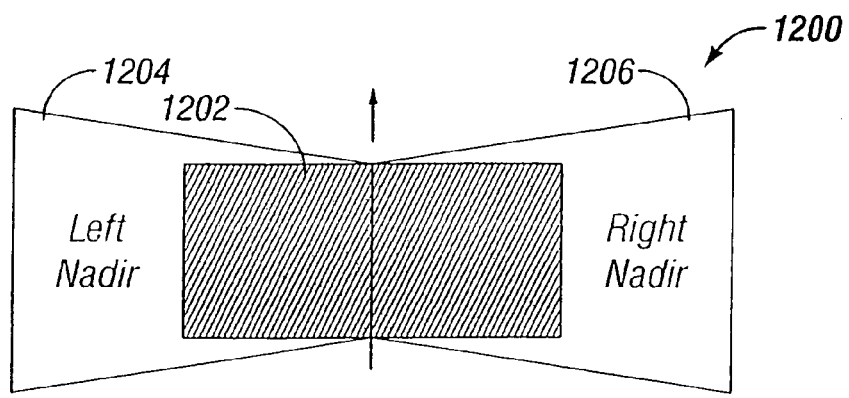
FIG. 12 is an illustration of lateral oversampling looking down from a vehicle according to certain embodiments of the present invention.

The present invention may employ a certain degree of lateral oversampling to improve output quality. FIG. 11 is an illustration of a lateral oversampling pattern 1100 looking down from a vehicle according to certain embodiments of the present invention showing minimal lateral oversampling. In this illustration, the central nadir region 1102 assigned to the center camera overlaps only slightly with the left nadir region 1104 and right nadir region 1106, so that overlap is minimized. FIG. 12 is an illustration of a lateral oversampling pattern 1200 looking down from a vehicle according to certain embodiments of the present invention showing a greater degree of lateral oversampling. In this illustration, the central nadir region 1202 shows a high degree of overlap with left nadir region 1204 and right nadir region 1206.

Figure 13:
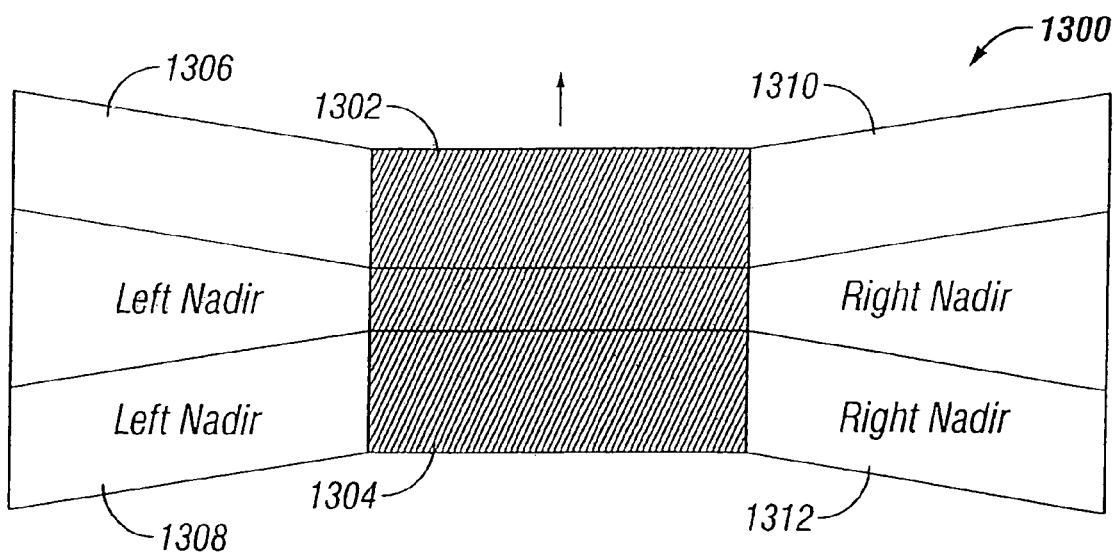
FIG. 13 is an illustration of flight line oversampling looking down from a vehicle according to certain embodiments of the present invention.

In addition to the use of lateral oversampling as shown in FIGS. 11 and 12, the present invention may employ flight line oversampling as well. FIG. 13 is an illustration of a flight line oversampling pattern 1300 looking down from a vehicle according to certain embodiments of the present invention showing a certain degree of flight line oversampling but minimal lateral oversampling. Central nadir regions 1302 and 1304 are overlapped to one another along the flight line, but do not overlap laterally with left nadir regions 1306 and 1308 or with right nadir regions 1310 and 1312.

Figure 14:
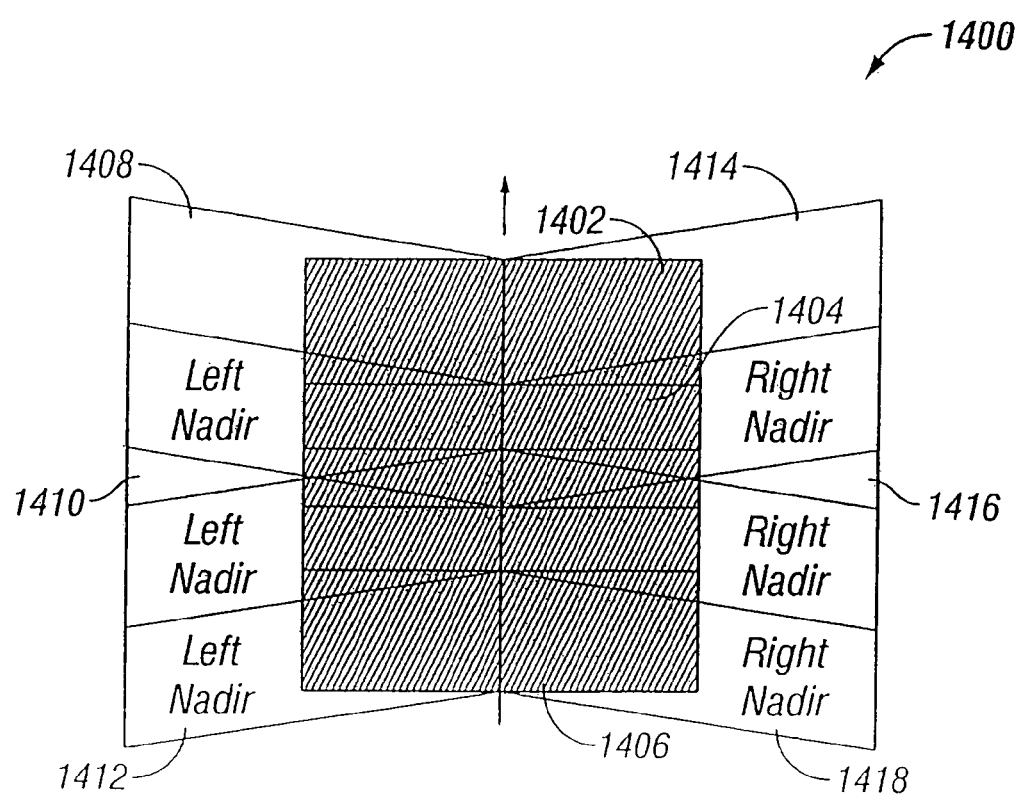
FIG. 14 is an illustration of flight line oversampling looking down from a vehicle according to certain embodiments of the present invention.

FIG. 14 is an illustration of flight line oversampling looking down from a vehicle according to certain embodiments of the present invention showing significant flight line oversampling as well as significant lateral oversampling. It can be seen that each of the central nadir regions 1402-1406 are significantly overlapped with one another as well as with left nadir regions 1408-1412 and right nadir regions 1414-1418. Left nadir regions 1408-1412 are overlapped with one another, as are right nadir regions 1414-1418. Accordingly, each point on the surface is sampled at least twice, and in some cases as many as four times. This technique uses the fact that in the area of an image that is covered twice, or more, by different camera sensors, a doubling of the image resolution is possible in both the lateral (across path) and flight line (along path) directions for an overall quadrupling of the resolution. In practice, the improvement in image/sensor resolution is somewhat less than doubled in each of the dimensions, approximately 40% in each dimension, or 1.4×1.4=~2 times. This is due to the statistical variations of the sub-pixel alignment/orientation. In effect, the pixel grid is rarely exactly equidistant from the overlaid pixel grid. If extremely precise lateral camera sensor alignments were made at the sub-pixel level, a quadrupling of image resolution could be realized.

Figure 15:
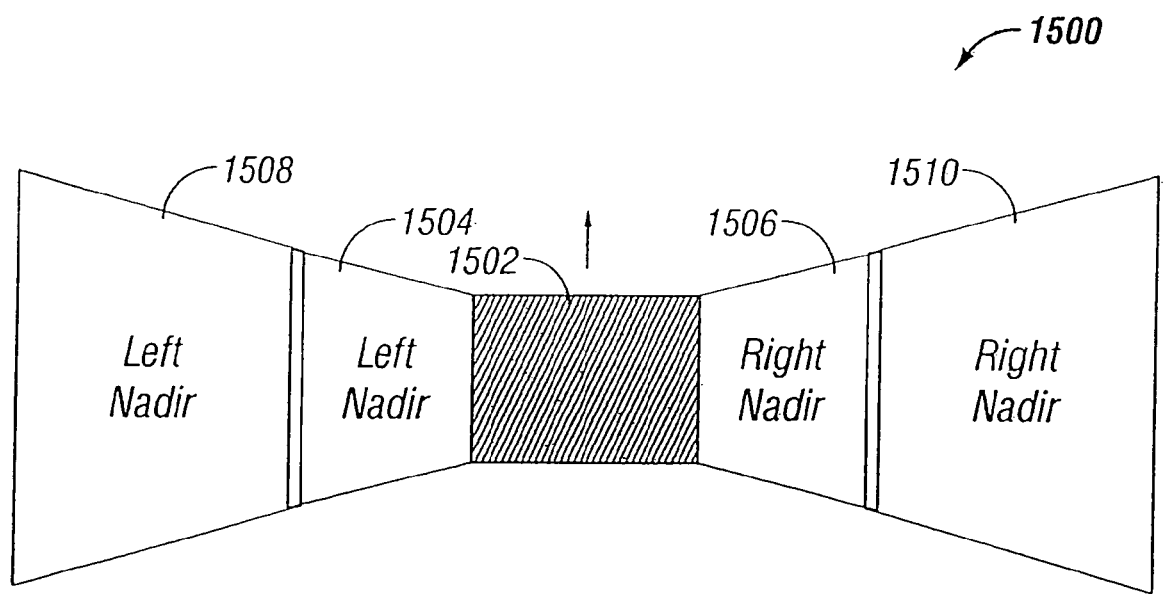
FIG. 15 is an illustration of progressive magnification looking down from a vehicle according to certain embodiments of the present invention.

FIG. 15 is an illustration of a progressive magnification pattern 1500 looking down from a vehicle according to certain embodiments of the present invention. Central nadir region 1502 is bounded on its left and right edges by inner left nadir region 1504 and inner right nadir region 1506, respectively. Inner left nadir region 1504 is bounded on its left edge by outer left nadir region 1508, while inner right nadir region 1506 is bounded on its right edge by outer right nadir region 1510. Note that these regions exhibit a minimal degree of overlap and oversampling from one to another.

Figure 16:
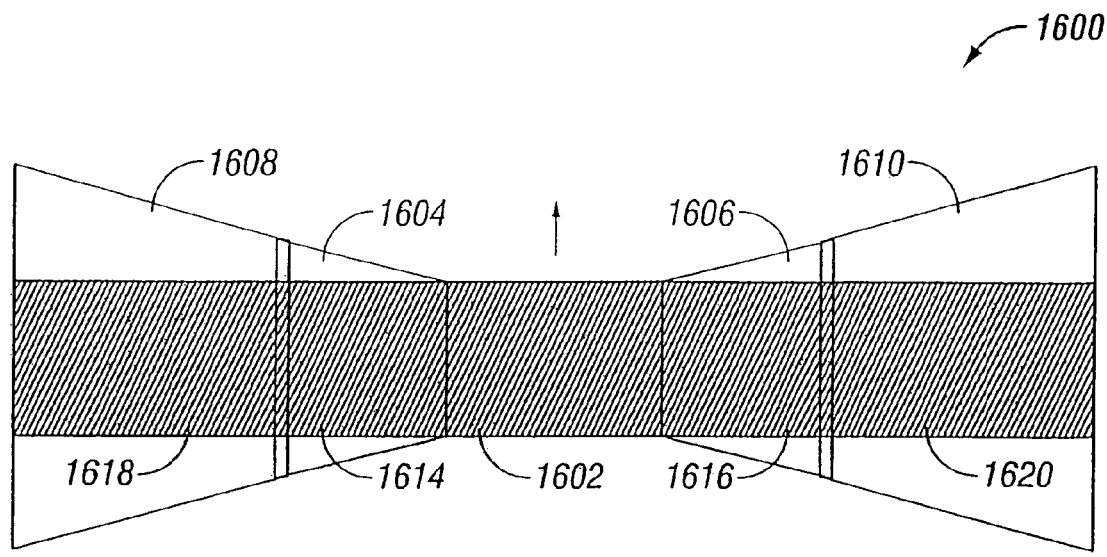
FIG. 16 is an illustration of progressive magnification looking down from a vehicle according to certain embodiments of the present invention.

FIG. 16 is an illustration of a progressive magnification pattern 1600 looking down from a vehicle according to certain embodiments of the present invention. Central nadir region 1602 is bounded on its left and right edges by inner left nadir region 1604 and inner right nadir region 1606, respectively. Inner left nadir region 1604 is bounded on its left edge by outer left nadir region 1608, while inner right nadir region 1606 is bounded on its right edge by outer right nadir region 1610. Note that, as above, these regions exhibit a minimal degree of overlap and oversampling from one to another. Within each of the nadir regions 1604-1610, there is a central image region 1614-1620 shown shaded in grey.

Figure 17:
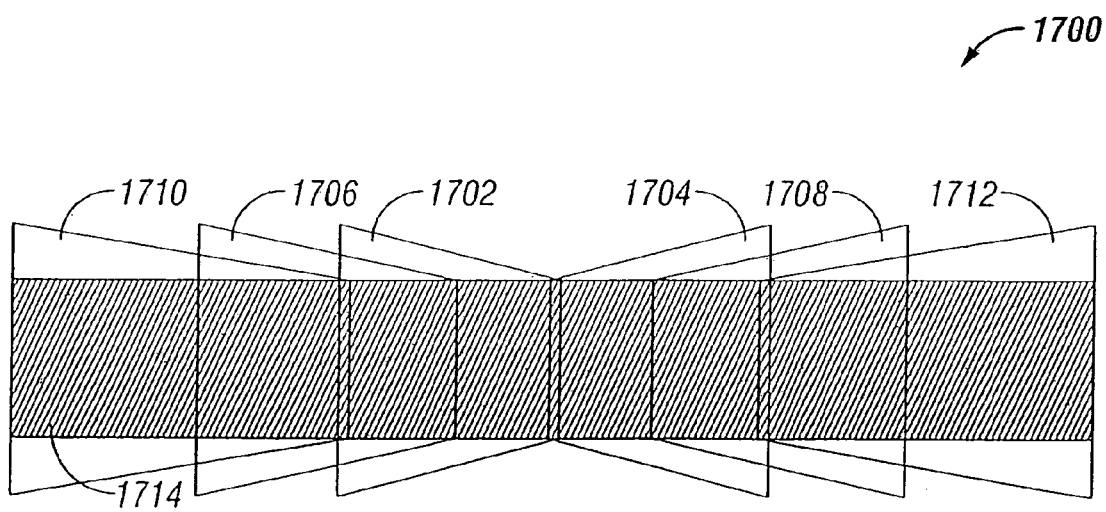
FIG. 17 is an illustration of progressive magnification looking down from a vehicle according to certain embodiments of the present invention.

FIG. 17 is an illustration of a progressive magnification pattern 1700 looking down from a vehicle according to certain embodiments of the present invention. In the center of pattern 1700, a left inner nadir region 1702 and a right inner nadir region 1704 overlap in the center. A left intermediate nadir region 1706 and a right intermediate nadir region 1708 are disposed partly outside of regions 1702 and 1704, respectively, each sharing an overlapping area with the respective adjacent area by approximately 50%. An outer left nadir region 1710 and an outer right nadir region 1712 are disposed partly outside of regions 1706 and 1708, respectively, each sharing an overlapping area with the respective adjacent area by approximately 50%. A central image region 1714 is disposed in the center of pattern 1700, comprised of the central portions of nadir regions 1702-1712.

FIG. 18 depicts a schematic of the architecture of a system 1800 according to certain embodiments of the present invention. System 1800 may include one or more GPS satellites 1802 and one or more SATCOM satellites 1804. One or more GPS location systems 1806 may also be included, operably connected to one or more modules 1808 collecting LIDAR, GPS and/or X, Y, Z location data and feeding such information to one or more data capture system applications 1812. One or more data capture system applications 1812 may also receive spectral data from a camera array 1822. A DGPS 1810 may communicate with one or more SATCOM satellites 1804 via a wireless communications link 1826. One or more SATCOM satellites 1804 may, in turn, communicate with one or more data capture system applications 1812.

One or more data capture system applications 1812 may interface with an autopilot 1816, an SSD and/or a RealTime StitchG system 1820, which may also interact with one another. SSD 1814 may be operably connected to RealTime DEM 1818. Finally, RealTime DEM 1818 and RealTime StitchG 1820 may be connected to a storage device, such as disk array 1824.

The modules, algorithms and processes described above can be implemented in a number technologies and configurations. Embodiments of the present invention may comprise functional instances of software or hardware, or combinations thereof. Furthermore, the modules and processes of the present invention may be combined together in a single functional instance (e.g., one software program), or may comprise operatively associated separate functional devices (e.g., multiple networked processor/memory blocks). All such implementations are comprehended by the present invention.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A system for generating a map, comprising:
   a global positioning receiver;
   a vehicle in alignment with a target area;
   an elevation measurement unit, in communication with the vehicle;
   a global positioning antenna, in communication with the vehicle;
   an attitude measurement unit, in communication with the vehicle;
   an imaging sensor system, disposed to the vehicle, comprising:
      a rigid mount plate affixed to the vehicle;
      a first rigid mount unit affixed to the mount plate and having a first and second imaging sensor disposed within the first mount unit, wherein the first imaging and second imaging sensors each have a focal axis passing through an aperture in the first mount unit and the mount plate, wherein the first and second imaging sensors each generate a first array of pixels, wherein each array of pixels is at least two dimensional;
      a second rigid mount unit affixed to the mount plate and having a third imaging sensor disposed within the second mount unit; and
      a computer in communication with the elevation measurement unit, the global positioning antenna, the attitude measurement unit, the first imaging sensor, and the second imaging sensor; correlating at least a portion of the image data from the first imaging sensor and the second imaging sensor to a portion of the target area based on input from one or more of: the elevation measurement unit, the global positioning antenna and the attitude measurement unit.

2. The system of claim 1, wherein the first mount unit, second mount unit, and mount plate flex less than $100^{th}$ of a degree during operation.

3. The system of claim 2, wherein the first mount unit, second mount unit, and mount plate flex less than $1,000^{th}$ of a degree during operation.

4. The system of claim 3, wherein the first mount unit, second mount unit, and mount plate flex less than $10,000^{th}$ of a degree during operation.

5. The system of claim 1, wherein the third imaging sensor has a third focal axis passing through an aperture in the second mount unit and the mount plate, wherein the third imaging sensor generates an at least two dimensional array of pixels.

6. The system of claim 1, wherein the third imaging sensor is selected from the group consisting of digital cameras, LIDAR sensors, infrared sensors, heat-sensing sensors, and gravitometers.

7. The system of claim 1, wherein the third imaging sensor is selected from the group consisting of a digital camera having a hyperspectral filter and a LIDAR.

8. The system of claim 1, wherein the first imaging sensor is calibrated relative to one or more attitude measuring devices selected from the group consisting of a gyroscope, an IMU, and a GPS.

9. The system of claim 1, wherein the first and second imaging sensors are selected from the group consisting of digital cameras, LIDAR sensors, infrared sensors, heat-sensing sensors, and gravitometers.

10. The system of claim 9, wherein the first and second imaging sensor is a digital camera and the third imaging sensor is a LIDAR.

11. The system of claim 1 or 5, wherein the computer is embedded within one or more imaging sensors.

12. An imaging sensor system comprising:
    a rigid mount plate affixed to a vehicle;
    a first rigid mount unit affixed to the mount plate and having a first and second imaging sensor disposed within the first mount unit, wherein the first imaging and second imaging sensors each have a focal axis passing through an aperture in the first mount unit and the mount plate, wherein the first and second imaging sensors each generate a first array of pixels, wherein each array of pixels is at least two dimensional;
    a second rigid mount unit affixed to the mount plate and having a third imaging sensor disposed within the second mount unit.

13. The system of claim 12, wherein the first mount unit, second mount unit, and mount plate flex less than $100^{th}$ of a degree during operation.

14. The system of claim 13, wherein the first mount unit, second mount unit, and mount plate flex less than $1,000^{th}$ of a degree during operation.

15. The system of claim 14, wherein the first mount unit, second mount unit, and mount plate flex less than $10,000^{th}$ of a degree during operation.

16. The system of claim 12, wherein the third imaging sensor has a third focal axis passing through an aperture in the second mount unit and the mount plate, wherein the third imaging sensor generates an at least two dimensional array of pixels.

17. The system of claim 12, wherein the third imaging sensor is selected from the group consisting of digital cameras, LIDAR sensors, infrared sensors, heat-sensing sensors, and gravitometers.

18. The system of claim 12, wherein the third imaging sensor is selected from the group consisting of a digital camera having a hyperspectral filter and a LIDAR.

19. The system of claim 12, wherein the first imaging sensor is calibrated relative to one or more attitude measuring devices selected from the group consisting of a gyroscope, an IMU, and a GPS.

20. The system of claim 12, wherein the first and second imaging sensors are selected from the group consisting of digital cameras, LIDAR sensors, infrared sensors, heat-sensing sensors, and gravitometers.

21. The system of claim 20, wherein the first and second imaging sensor is a digital camera and the third imaging sensor is a LIDAR.

22. A method of calibrating imaging sensors, comprising:
    determining the position of an AMU using a target area;
    determining the position of a first imaging sensor within a first rigid mount unit relative to the AMU;
    determining the position of one or more subsequent imaging sensors within the first rigid mount unit relative to the AMU;
    calibrating the position of the first imaging sensor relative to the AMU using the target area and determining the boresight angle of the first imaging sensor;
    calculating the position of one or more subsequent imaging sensors within the first rigid mount unit relative to the first imaging sensor; and calibrating the one or more subsequent imaging sensors relative to the first imaging sensor using the boresight angle of the first imaging sensor.

23. The method of claim 22, wherein the method further comprises determining the position of a second imaging sensor within a second rigid mount unit relative to the AMU;

calculating the position of the second imaging sensor within the second rigid mount unit relative to the first imaging sensor; and calibrating the second imaging sensor relative to the first imaging sensor using the boresight angle of the first imaging sensor.

* * * * *